United States Patent
McLaughlin et al.

(10) Patent No.: US 10,630,647 B2
(45) Date of Patent: Apr. 21, 2020

(54) SECURE WIRELESS COMMUNICATION BETWEEN CONTROLLERS AND ACCESSORIES

(71) Applicant: Apple Inc., Cupertino, CA (US)

(72) Inventors: Kevin P. McLaughlin, Waikoloa, HI (US); Anush G. Nadathur, San Jose, CA (US); Matthew C. Lucas, San Jose, CA (US); Srinivas Rama, Cupertino, CA (US); Dennis Mathews, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/400,386

(22) Filed: Jan. 6, 2017

(65) Prior Publication Data
US 2017/0201499 A1    Jul. 13, 2017

Related U.S. Application Data

(60) Provisional application No. 62/276,809, filed on Jan. 8, 2016, provisional application No. 62/348,989, filed on Jun. 12, 2016.

(51) Int. Cl.
*H04L 9/32* (2006.01)
*H04L 29/06* (2006.01)
(Continued)

(52) U.S. Cl.
CPC ........ *H04L 63/0428* (2013.01); *H04L 9/0838* (2013.01); *H04L 9/3247* (2013.01);
(Continued)

(58) Field of Classification Search
CPC ..... H04L 63/0428; H04L 63/101; H04L 1/16; H04L 9/0838; H04W 4/80
See application file for complete search history.

(56) References Cited

U.S. PATENT DOCUMENTS

| 6,772,331 B1 | 8/2004 | Hind et al. |
| 2003/0186715 A1* | 10/2003 | McGowan ............ H04M 15/00 455/509 |

(Continued)

FOREIGN PATENT DOCUMENTS

| CN | 101501698 A | 8/2009 |
| WO | 2015/184387 A1 | 12/2015 |

(Continued)

OTHER PUBLICATIONS

Extended European Search Report dated Apr. 6, 2017 in European Application No. 17150108.3-1870. 9 pages.

(Continued)

*Primary Examiner* — Wasika Nipa
*Assistant Examiner* — Samuel Ambaye
(74) *Attorney, Agent, or Firm* — Kilpatrick, Townsend & Stockton

(57) ABSTRACT

A controller and an accessory controllable by the controller can communicate using secure read and write procedures. The procedures can include encrypting identifiers of accessory characteristics targeted by a read or write operation as well as any data being read or written. The procedures can also include the accessory returning a cryptographically signed response verifying receipt and execution of the read or write instruction. In some instances, a write procedure can be implemented as a timed write in which a first instruction containing the write data is sent separately from a second instruction to execute the write operation; the accessory can disregard the write data if the second instruction is not received within a timeout period after receiving the first instruction.

19 Claims, 16 Drawing Sheets

(51) Int. Cl.
*H04W 4/80* (2018.01)
*H04L 9/08* (2006.01)
*H04W 12/08* (2009.01)
*H04L 1/16* (2006.01)
*H04L 29/08* (2006.01)
*H04W 4/70* (2018.01)
*H04W 12/02* (2009.01)
*H04W 12/12* (2009.01)

(52) U.S. Cl.
CPC ............ *H04L 63/101* (2013.01); *H04W 4/80* (2018.02); *H04W 12/08* (2013.01); *H04L 1/16* (2013.01); *H04L 63/0435* (2013.01); *H04L 67/02* (2013.01); *H04W 4/70* (2018.02); *H04W 12/02* (2013.01); *H04W 12/12* (2013.01)

(56) References Cited

U.S. PATENT DOCUMENTS

| | | | |
|---|---|---|---|
| 2004/0193709 A1* | 9/2004 | Selvaggi | H04L 41/0213 709/224 |
| 2008/0137828 A1 | 6/2008 | Chmaytelli | |
| 2010/0153709 A1* | 6/2010 | Thomas | G06F 21/445 713/155 |
| 2012/0054493 A1* | 3/2012 | Bradley | H04W 8/005 713/171 |
| 2012/0083208 A1 | 4/2012 | Giles et al. | |
| 2013/0198516 A1* | 8/2013 | Fenton | H04L 63/0869 713/168 |
| 2014/0006496 A1* | 1/2014 | Dearman | H04L 67/16 709/204 |
| 2014/0365694 A1 | 12/2014 | Bolton et al. | |
| 2014/0366105 A1* | 12/2014 | Bradley | H04W 12/08 726/5 |
| 2015/0296325 A1* | 10/2015 | Lee | H04W 8/22 455/41.2 |
| 2015/0351145 A1 | 12/2015 | Burks et al. | |

FOREIGN PATENT DOCUMENTS

| | | |
|---|---|---|
| WO | 2016108646 A1 | 7/2016 |
| WO | 2017/007723 A1 | 1/2017 |

OTHER PUBLICATIONS

Belshe, M. et al., "Hypertext Transfer Protocol Version 2 (HTTP/2)." Internet Engineering Task Force (IETF), Request for Comments: 7540, Category: Standards Track, ISSN: 2070-1721. May 2015. 96 pages.
Petullo, Michael W. et al., "MinimaLT: Minimal-latency Networking Through Better Security." https://cr.yp.to/tcpip/minimalt. May 22, 2013. 13 pages.
Rowberg, Jeff, "[Reference]: BLE master/slave, GATT client/server, and data RX/TX basics." Bluegiga Forums / Knowledgebase / Bluetooth Smart. Posted on Jul. 31, 2013. 5 pages.
Krishnaswamy, Vijaykumar et al., "Shared State Consistency for Time-sensitive Distributed Applications." kv@cc.gatech.edu. 2001. 19 pages.
Krishnaswamy, et al., "Shared State Consistency for Time-Sensitive Distributed Application." IEEE Computer Society in Washington, Apr. 16-19, 2001. 19 pages.
Petullo, et al., MinimalT: "Minimal-Latency Networking Through Better Security." Available online at https://cr.yp.to/tcpip/minimalt. May 22, 2013. 13 pages.
Rescorla, E., "The Transport Layer Security (TLS) Protocol," version 1.3 draft-ietf-tls-tls13-07. RTFM, Inc., Network Working Group. Jul. 8, 2015. 98 pages.
Silicon Labs (Community), "Bluetooth Knowledge Base, BLE Master/Slave, GATT Client/Server, and DATA RX/TX Basics." Aug. 6, 2015. 13 pages.
Final Office Action dated Jul. 10, 2019 in U.S. Appl. No. 16/141,655. 18 pages. (no copy provided).
Notice of Decision to Grant dated Jun. 27, 2019 in Application No./Patent No. 18198675.3-1218 / 3445002. 2 pages.
European Search Report dated Dec. 14, 2018 in EP Application No. 18198675.3-1218. 5 pages.
First Action Interview Pilot Program Pre-Interview Communication dated Jan. 11, 2019 in U.S. Appl. No. 16/141,655. 8 pages. (no copy provided).
Chinese Office Action dated Jul. 18, 2019 in Chinese Application No. 201710008835.5. 23 pages (includes English translation).
Non-Final Office Action dated Dec. 9, 2019 in U.S. Appl. No. 16/141,655. 24 pages.

\* cited by examiner

| Service | Characteristic | IID | Value |
|---|---|---|---|
| Accessory Info Service | Service IID | 1 | 1 |
| | Manufacturer | 2 | "Acme" |
| | Model | 3 | "A-Lock" |
| | Name | 4 | "A Name" |
| | SerialNumber | 5 | "7353" |
| Protocol Info Service | Service IID | 6 | 6 |
| | ProtocolVersion | 7 | 2.1.1 |
| | CompatibleVersion | 8 | 2.0.0 |
| Lock Mechanism 310 | Service IID | 9 | 9 |
| | CurrentState | 10 | false |
| | TargetState | 11 | false |
| | Name | 12 | "A-Lock-Mech" |
| Light Bulb 312 | Service IID | 13 | 9 |
| | On | 14 | false |
| | Brightness | 15 | 0.5 |
| | Name | 16 | "A-Light" |

*FIG. 3*

SECURE WIRELESS COMMUNICATION BETWEEN CONTROLLERS AND ACCESSORIES

CROSS-REFERENCES TO RELATED APPLICATIONS

This application claims the benefit of U.S. Provisional Application No. 62/276,809, filed Jan. 8, 2016 and U.S. Provisional Application No. 62/348,989, filed Jun. 12, 2016, the disclosures of which are incorporated herein by reference.

This disclosure is also related to the following U.S. patent applications: application Ser. No. 14/614,914, filed Feb. 5, 2015; application Ser. No. 14/725,891, filed May 29, 2015; and application Ser. No. 14/725,912, filed May 29, 2015. The disclosures of these applications are incorporated by reference herein in their entirety.

BACKGROUND

The present disclosure relates generally to remote control systems for controlling accessories and in particular to secure wireless communication between controllers and accessories.

Electronic devices are becoming increasingly popular in a range of applications. Mobile phones, tablet computers, home entertainment systems, and the like are just some of the electronic devices users interact with regularly.

Another category of electronic devices that is becoming more popular includes various electronically controllable "accessory" devices, such as thermostats, lighting devices, household appliances, etc. Users want to control these devices easily and conveniently using mobile devices and the like and to automate their operation.

At the same time, users are understandably concerned about security implications of allowing remote control of accessory devices. For instance, there is a concern that an unauthorized controller device might monitor or intercept communications between an authorized device and an accessory such as a door lock. The unauthorized device might be able to use the monitored or intercepted communications to operate the accessory in an undesirable manner.

SUMMARY

Certain embodiments of the present invention relate to providing secure wireless communication between a controller device (or "controller") and an accessory device (or "accessory"). In some embodiments, the accessory can expose an attribute database defining services and characteristics that represent various aspects of accessory functionality, and a controller device can invoke accessory functionality by writing to characteristics. For example, the accessory can provide a door lock service having a lock state characteristic that can have a Boolean (true/false) value. A controller can lock (or unlock) the door by sending a valid instruction to the accessory to write the value true (or false) to the lock state characteristic; the accessory can respond to the instruction by operating a physical lock mechanism to lock (or unlock) the door and updating the value of the lock state characteristic in its database.

Various security measures can be implemented to allow the accessory to distinguish between a valid write instruction from an authorized controller (which should result in changing the state) and an invalid write instruction (which should be ignored). For example, an authorized controller can establish a pairing with the accessory and perform related pair verification processes to provide authentication and encryption of messages exchanged between the accessory and the controller, allowing the accessory to verify that a particular write instruction originated from an authorized controller. For instance, the controller can encrypt the characteristic value to be written using a cryptographic key known only to the accessory and controller, and this can provide some measure of security.

However, if the attribute database is exposed, an unauthorized device (referred to herein as a "man in the middle" or "MITM") may be able to determine that the controller is writing to a particular characteristic; even without knowing what value is being written, the MITM may be able to use the information it has to operate the accessory. For instance, the MITM might redirect a write request to a characteristic other than the target characteristic specified by the authorized controller, or the MITM might be able to delay the delivery of a write request.

Accordingly, some embodiments of the present invention provide techniques that can be used to conceal at least some information about the attribute database from unauthorized devices. For instance, the portion of the database that is transmitted in the clear (i.e., without encryption) can be limited in order to reduce the amount of information exposed. In some embodiments, the portion of the attribute database that is transmitted into the clear can be limited, e.g., to an "instance identifier" of each service and characteristic. Other, "sensitive" information about the services and characteristics can be provided to an authorized controller in an encrypted form. In some embodiments, the "sensitive" information can include the values of some or all characteristics as well as selected descriptors of a characteristic (e.g., a type descriptor that may indicate which aspect of accessory state the characteristic represents). This can reduce the amount of information about the accessory that is exposed to unauthorized controllers, thereby making it more difficult for an unauthorized controller to perform operations on the accessory.

Some embodiments can provide additional security in the form of secure read and/or write procedures in which the identifier of the "target" characteristic being read or written (as well as the new value in the case of a secure write procedure) is included in an encrypted and signed data block and in which the accessory returns an encrypted and signed data block including the read data (in the case of a secure read procedure) and additional information usable to confirm that the operation has been performed The encrypted and/or signed data blocks can be encrypted and/or signed using a key that is known only to the controller and the accessory (e.g., a session key of a pair-verified session as described below). Encrypting the identifier of the target characteristic can make it more difficult for an unauthorized device to redirect a request to a different characteristic, and encrypting the data being read or written can prevent unauthorized devices from obtaining information about the accessory's state. This makes it less likely that an unauthorized device would be able to exploit any communications it happens to intercept. Further, receiving a signed confirmation from the accessory can allow the controller to detect a problem, e.g., if a communication was not received or if the corresponding operation was not carried out in a timely manner. This allows the controller to take remedial action, such as retrying the communication or notifying the user of a problem.

An example of a secured write procedure can be a "timed" write procedure. In a timed write procedure, the controller sends a first instruction (e.g., a "write-data" instruction) that includes the data to be written as an encrypted payload. Receipt of this instruction can be confirmed by the accessory by sending a first response to the controller. The controller can then send a second instruction (e.g., an "execute-write" instruction) to indicate that the accessory should execute the write operation using the previously sent data. The accessory does not write any data to the target characteristic until the second instruction is received. In response to receiving the second instruction, the accessory can execute the write operation and send a second response to the controller to confirm completion (or indicate error). In some embodiments, the controller can include in the first instruction a "time to live" parameter that can be used to define a time to live for the write data, or the accessory can be programmed with a time to live parameter. If the accessory does not receive the second instruction before expiration of the time to live, the accessory can disregard the second instruction and may respond with an error message. In some embodiments, the controller can also require that the accessory respond to the first instruction within a controller timeout period; if the accessory does not respond, the controller can refrain from sending the second instruction.

The following detailed description will provide a further understanding of the nature and advantages of the present invention.

BRIEF DESCRIPTION OF THE DRAWINGS

FIG. 3 shows an example of a GATT database according to an embodiment of the present invention.

DETAILED DESCRIPTION

Example Environment

Figure 1:
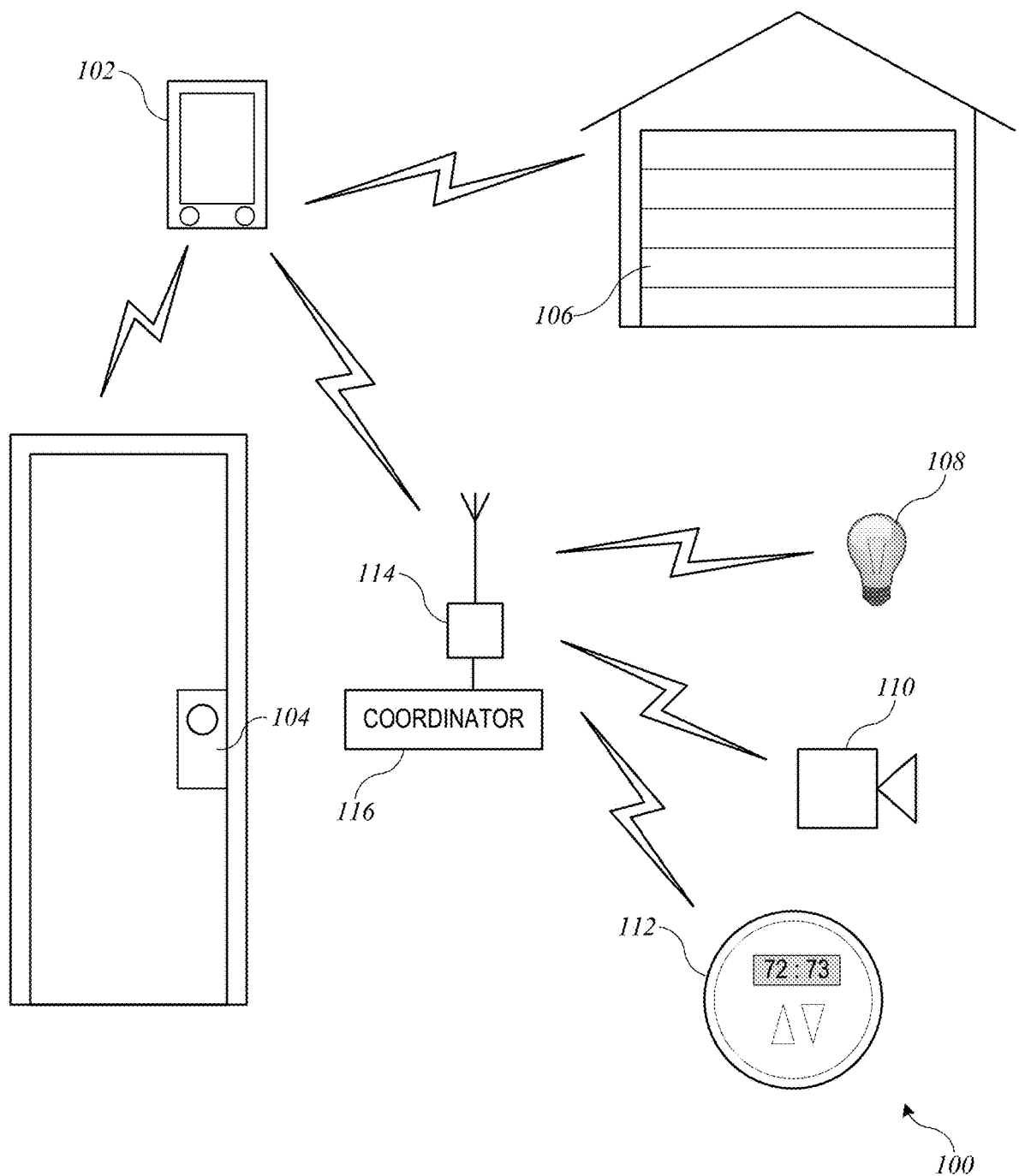
FIG. 1 shows a home environment according to an embodiment of the present invention.

FIG. 1 shows a home environment 100 according to an embodiment of the present invention. Home environment 100 includes a controller 102 that can communicate with various accessory devices (also referred to as accessories) located in the environment. Controller 102 can include, for example, a desktop computer, laptop computer, tablet computer, smart phone, wearable computing device, personal digital assistant, or any other computing device or set of devices that is capable of communicating command-and-control messages to accessories (e.g., as described in above-referenced U.S. application Ser. No. 14/614,914) and presenting a user interface to allow a user to indicate desired operations on the accessories. In some embodiments, controller 102 can be implemented using multiple discrete devices. For example, there can be a base station that communicates with accessories and that can be installed in a fixed location in environment 100, and one or more mobile remote-control stations (e.g., a handheld or wearable device such as a mobile phone, tablet computer, smart watch, eyeglasses, etc.) that provide a user interface and communicate with the base station to effect control over accessories. In some embodiments, the base station can function as a coordinator or proxy as described below.

Any type of accessory device can be controlled. Examples of accessory devices include door lock 104, garage door system 106, light fixture 108, security camera 110, and thermostat 112. In some instances, controller 102 can communicate directly with an accessory; for instance, controller 102 is shown communicating directly with door lock 104 and garage door system 106. In other instances, controller 102 can communicate via an intermediary. For instance, controller 102 is shown communicating via a wireless network access point 114 with accessories 108, 110, 112 that are on a wireless network provided by access point 114. As noted above, in some embodiments, controller 102 can include a base station, and base station functionality can be integrated into access point 114 or into one of the accessories that is to be controlled (e.g., thermostat 112). Another type of intermediary can be coordinator 116, which can relay messages from a controller to an accessory and can also implement various control logic to automate or optimize interactions with accessories; examples are described below.

Various communication transports and combinations of transports can be used, and different transports can be used with different devices. For example, some wireless transports such as the Bluetooth® Classic or Bluetooth® Smart (or Low Energy) communication protocol and standards promulgated by the Bluetooth SIG (referred to herein as "Bluetooth" and "Bluetooth LE") can support direct point-to-point communication between devices within a limited range. Other wireless transports such as a wireless network complying with Wi-Fi® networking standards and protocols promulgated by the Wi-Fi Alliance (referred to herein as a "Wi-Fi network") can define a wireless network with a central access point that routes communications between different devices on the network. Further, while wireless communication transports are shown, wired transports can also be provided for some or all of the accessories. For example, light bulb 108 can be connected to access point 114 by a wired connection, and controller 102 can communicate with light bulb 108 by sending messages wirelessly to access point 114, which can deliver the messages to light bulb 108 via the wired connection. As another example, coordinator 116 can be connected to access point 114 by a wired connection as shown (this connection can be wireless if desired), and controller 102 can communicate with accessories such as light bulb 108 by sending messages to coordinator 116 via access point 114; coordinator 116 can communicate with light bulb 108, either via access point 114 or via another channel such as a Bluetooth LE channel. Other combinations of wired and wireless communication are also possible.

Further, while one controller 102 is shown, a home environment can have multiple controller devices. For example, each person who lives in the home may have his or her own portable device (or devices) that can act as a controller for some or all of accessories 104-112. Different controller devices can be configured to communicate with different subsets of the accessories; for example, a child's controller might be blocked from modifying settings on thermostat 112, while a parent's controller device is permitted to modify the settings. Such permissions or privileged can be configured and controlled, for example, using techniques described in above-referenced U.S. application Ser. No. 14/725,891.

In some embodiments, a uniform accessory protocol ("UAP") can facilitate communication by a controller 102 with one or more accessories 104-112. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 112, characteristics can include power (on or off), current temperature, and target temperature. The set of services and characteristics of an accessory can be represented as an attribute database for the accessory, and the accessory can expose all or part of the attribute database to a given controller. In some embodiments, the format in which an attribute database is presented to and/or accessed by a controller may be transport-dependent while conforming to the same underlying accessory model. Examples of accessory models based on services and characteristics are described in above-referenced U.S. application Ser. No. 14/614,914.

The protocol can further define message formats for controller 102 to send command-and-control messages (requests) to accessory 112 (or other accessories) and for accessory 112 to send response messages to controller 102. The command-and-control messages can allow controller 102 to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The message format can be uniform across accessories. Examples of message formats are described in above-referenced U.S. application Ser. No. 14/614,914. In some embodiments, the message format may be transport-dependent, e.g., depending on how the attribute database is represented for a particular transport. For instance, in the case of a Bluetooth LE transport, the attribute database format can leverage the generic attribute (GATT) profile as defined in Bluetooth LE specifications. In the case of a transport based on the Internet Protocol (IP) suite (e.g., a Wi-Fi transport), the attribute database can be represented using a notation such as JSON (JavaScript Object Notation); JSON objects representing all or part of the attribute database can be communicated between the accessory and the controller using IP-based protocols such as HTTP.

The protocol can further provide notification mechanisms that allow accessory 112 (or other accessories) to selectively notify controller 102 in the event of a state change. Multiple mechanisms can be implemented, and controller 102 can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The uniform accessory protocol can specify one or more mechanisms (including mechanisms referred to herein as "pair setup" and "pair add") for establishing a "pairing" between controller 102 and a given accessory (e.g., door lock accessory 104) under circumstances that provide a high degree of confidence that the user intends for controller 102 to be able to control accessory 104. Pair setup can include an out-of-band information exchange (e.g., the user can enter a numerical or alphanumeric PIN or passcode provided by accessory 104 into an interface provided by controller 102) to establish a shared secret. This shared secret can be used to support secure exchange of "long-term" public keys between controller 102 and accessory 104, and each device can store the long-term public key received from the other, so that an established pairing can be persistent. (Herein, the notation "LTPKA" and "LTPKC" may be used to denote the long-term public keys of the accessory and the controller, respectively.) After a pairing is established, controller 102 is considered authorized, and thereafter, controller 102 and accessory 104 can go in and out of communication as desired without losing the established pairing. When controller 102 attempts to communicate with or control accessory 104, a "pair verify" process can first be performed to verify that an established pairing exists (as would be the case, e.g., where controller 102 previously completed pair setup with accessory 104). The pair verify process can include each device demonstrating that it is in possession of a long-term private key corresponding to the long-term public key that was exchanged during pair setup. (Herein, the notation "LTSKA" and "LTSKC" may be used to denote the long-term private, or secret, keys of the accessory and the controller, respectively.) The pair-verify process can further include establishing a new shared secret or session key(s) to encrypt all communications during a "pair-verified" session (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup with the accessory or by having a pairing added by a controller that previously performed pair setup with the accessory), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

It will be appreciated that home environment 100 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be uniformly applied in any context with one or more controllers and one or more accessories, regardless of accessory function or controller form factor or specific interfaces.

Figure 2:
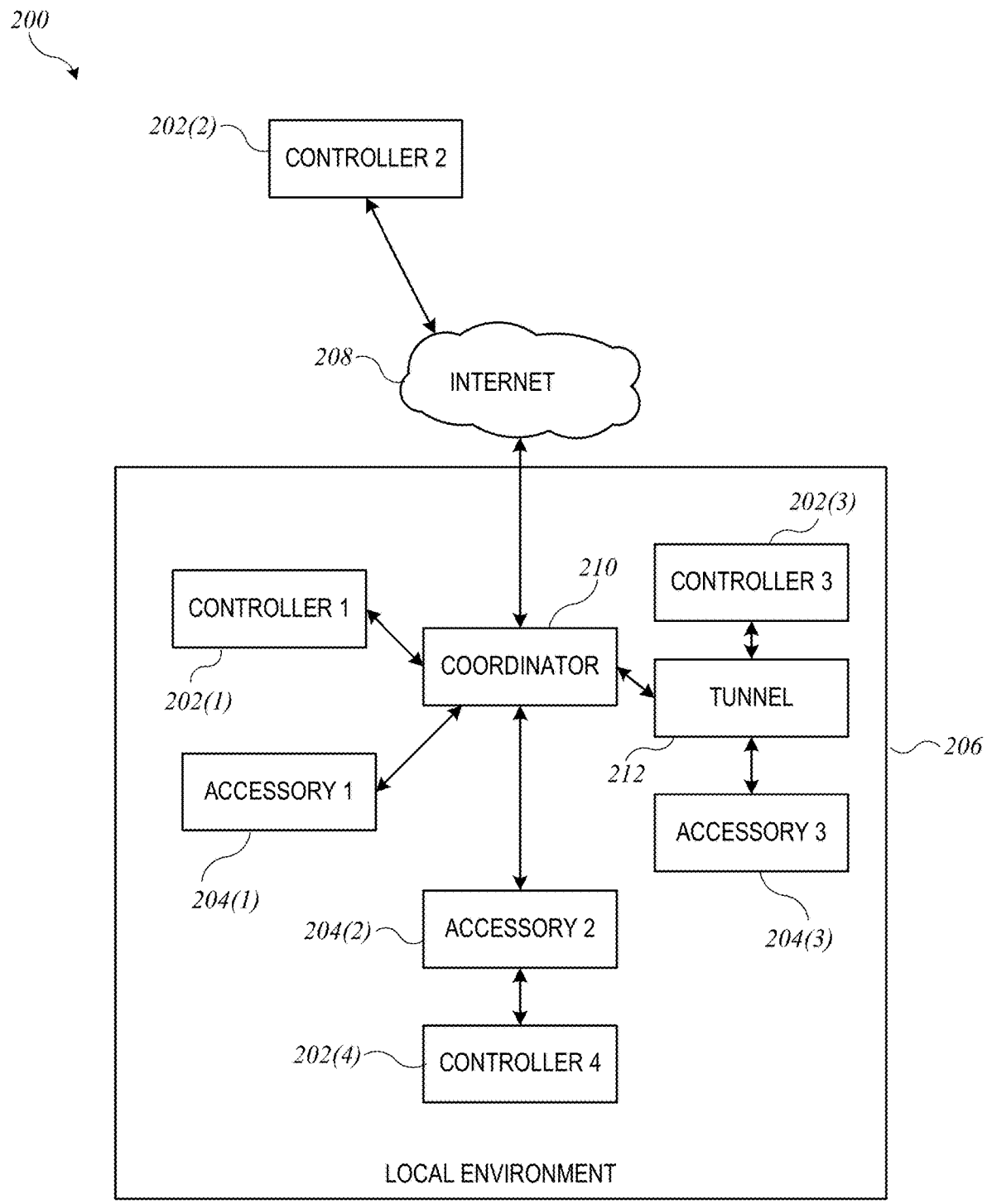
FIG. 2 shows a network configuration according to an embodiment of the present invention.

FIG. 2 shows a network configuration 200 according to an embodiment of the present invention. Configuration 200 allows controllers 202 to communicate with accessories 204 located in local environment 206 (e.g., a home environment). Each controller 202 can be an electronic device owned and/or operated by a user who frequents environment 206 (e.g., a resident of the home or a regular visitor to the home). Controllers 202 can each be similar to controller 102 of FIG. 1, and accessories 204 can be similar to various accessories shown in FIG. 1.

In some instances, a controller 202 can communicate directly with an accessory 204; for instance, controller 202(4) is shown communicating directly with accessory 204(2). Such communication can occur using the uniform accessory protocol on any transport supported by both controller 202(4) and accessory 204(2), such as a Bluetooth LE transport or Wi-Fi transport or the like.

In some instances, a controller 202 can communicate indirectly with an accessory 204. For instance, accessories 204(1) and 204(2) can each communicate with a coordinator device (or "coordinator") 210 that can be located with local environment 206. As used herein, a "coordinator" can be an electronic device that is capable of operating as a controller of accessories 204 as well as relaying messages from other controllers (e.g., controllers 202) to accessories 204. In some embodiments, coordinator 210 can be an "intelligent" device that can coordinate operations among multiple controllers and/or accessories and is not limited to passively relaying messages. Coordinator 210 can include any device that is capable of presenting itself as a controller to accessories 204 and that is capable of communicating securely with controllers 202. In some embodiments, coordinator 210 can present itself to accessories 204 as a controller and to controllers 202 as an accessory that provides services for communicating with other accessories (e.g., accessories 204); examples are described in above-referenced U.S. application Ser. No. 14/725,891. In some embodiments, coordinator 210 can be a device that is expected to stay in local environment 206 and that is expected to be powered on and available for communication most or all the time. (It is to be understood that coordinator 210 can occasionally be unavailable, e.g., in connection with software or firmware upgrades, power outages, or other intermittent occurrences.) For example, coordinator 210 can be implemented in a desktop computer, a Wi-Fi or access-point unit, a dedicated accessory-control base station, a set-top box for a television or other appliance (which can implement coordinator functionality in addition to interacting with the television or other appliance), or any other electronic device as desired.

In some embodiments, coordinator 210 and accessories 204 can communicate using a local area network (LAN), such as a Wi-Fi network and/or a point-to-point communication medium such as Bluetooth LE. It is to be understood that other communication protocols can be used. In some embodiments, controllers 202, accessories 204, and coordinator 210 can support a uniform accessory protocol as described above that can be supported using both Wi-Fi and Bluetooth LE as transports.

In the example of FIG. 2, controllers 202(1) and 202(4) are currently located in local environment 206 with accessories 204 and coordinator 210. For example, controller 202(1) can be on the same LAN as accessories 204 and coordinator 210. Controller 202(2) is currently located outside local environment 206 but is connected to a communication network 208 (e.g., the Internet); such a controller is said to be "remote" from accessories 204 and coordinator 210. It is to be understood that any or all of controllers 202 can be mobile devices that are sometimes within local environment 206 and sometimes outside local environment 206. Accessories 204 need not be mobile and need not be connected to communication network 208. In some embodiments, coordinator 210 can be connected to communication network 208 and can facilitate access to accessories 204 by remote controller 202(2).

In the example shown, controllers 202 can communicate with accessories 204 via coordinator 210, and coordinator 210 can be said to act as a "proxy" for accessories 204. Coordinator 210 can communicate directly with accessories 204(1) and 204(2). In the case of accessory 204(3), coordinator 210 can communicate via "tunnel" 212. Tunnel 212 can operate to relay commands between a controller (including coordinator 210) and an accessory; in some embodiments, tunnel 212 and/or coordinator 210 can also translate between different communication protocols used by controllers 202 and accessory 204(3). In some embodiments, tunnel 212 can provide or support secure end-to-end communication between coordinator 210 and accessory 204(3). Examples of proxies, tunnels, and bridges are described in above-referenced U.S. application Ser. No. 14/725,891.

In some instances, a controller 202 may communicate with an accessory 204 using tunnel 212 without the intervention of coordinator 210. For example, as shown, controller 202(3) may communicate with accessory 204(3) via tunnel 212. The communication between controller 202(3) and tunnel 212 can use the same transport as or a different transport from the communication between tunnel 212 and accessory 204(3). Where different transports are used, tunnel 212 can translate uniform accessory protocol commands between a first transport (e.g., Wi-Fi or other IP-based transport) used between controller 202(3) and tunnel 212 and a second transport (e.g., Bluetooth LE transport) used between tunnel 212 and accessory 204(3). In some embodiments, coordinator 210 can also provide tunneling functionality to some or all accessories 204.

It will be appreciated that network configuration 200 is illustrative and that variations and modifications are possible. Any number of controllers and any number of accessories can be included in a network configuration. In some embodiments, coordinator 210 can be replaced with a proxy that relays messages between controllers and accessories without necessarily reading the content of the messages. In some embodiments, coordinator 210 can be omitted entirely. Some or all of accessories 204 may be accessible only within the local environment. Further, as described below, different controllers 202 may have different levels of permission in regard to accessing accessories 204; for instance, remote access via network 208 may be permitted for some controllers 202 but not for other controllers 202. Those skilled in the art with access to the present disclosure will appreciate that techniques described herein can be used for secure communication between controllers and accessories using direct and/or indirect communication paths as desired, including paths where a tunnel or coordinator may act as an intermediary.

Example Attribute Database

As noted above, an accessory can provide information about its controllable functionality using an attribute database. For instance, the accessory can define a collection of services, with each service being defined as a set of characteristics, each of which can represent an aspect of the accessory's state and can have a defined value. Controllers can determine the accessory's state by reading values of the characteristics and/or modify the accessory's state by writing values to the characteristics. The attribute database can be represented in various formats; as noted above, the format used to represent the attribute database can be dependent on the communication transport(s) supported by the accessory.

For example, some accessories may communicate using Bluetooth or Bluetooth LE protocols. The Bluetooth LE standard defines a generic attribute ("GATT") profile, in which characteristics and services can be identified using a system of universally unique identifiers ("UUIDs"). Each characteristic or service can have various associated descriptors, and the set of characteristics, services, and descriptors can define a GATT database for the accessory. An accessory that has a GATT database can provide its GATT database to any controller that requests it. Such transmission can occur outside the context of a UAP pair-verified session (as described above). Consequently, the GATT database may become visible to unauthorized devices.

According to some embodiments of the present invention, a GATT database for an accessory can be structured such that information sent in the clear is of limited (or no) use to an unauthorized controller. The "sensitive" information (e.g., information mapping a characteristic UUID to a particular aspect of accessory state or functionality, such as a door lock mechanism, as well as the values of various characteristics) can be excluded from the information sent in the clear; sensitive information can be provided to an authorized controller via a secure read process (e.g., a signature read process), examples of which are described below.

FIG. 3 shows an example of a GATT database 300 according to an embodiment of the present invention. GATT database 300 can define various services and characteristics for an accessory (e.g., any of accessories 104-112 of FIG. 1 or accessories 204 of FIG. 2). In the representation in FIG. 3, each row corresponds to a characteristic (column 302). A service (column 304) can be defined as a group of characteristics. Although not expressly shown in FIG. 3, it is to be understood that each service and characteristic can be assigned a UUID.

Each characteristic is assigned an "instance identifier" (also referred to as an "instance ID" or "IID") as shown (column 306). The assignment of instance identifiers can be made as desired, provided that each characteristic in GATT database 300 for a given accessory has a unique instance identifier. It should be noted that the instance identifiers need not be correlated with the UUIDs. In this example, each service has a characteristic labeled "Service IID"; this can facilitate assigning instance identifiers to services.

Each characteristic can also have a value (column 308). In some embodiments, the accessory communicates the value of a characteristic only within a pair-verified communication session of the uniform accessory protocol. Examples are described below.

In this example, the accessory can correspond to a door lock with an associated light (e.g., to illuminate the area around the door). The door lock can be controlled using lock mechanism service 310. The "CurrentState" characteristic can be read by a controller to determine whether the door is currently locked or unlocked and can be updated by the accessory whenever the state of the lock mechanism changes. The "TargetState" characteristic can be written by a controller to instruct the accessory to lock or unlock the door. In some embodiments, reading and/or writing to these characteristics can be limited to authorized controllers within a pair-verified session. Further, secure read and/or write operations, examples of which are described below, can be used for added security. The "Name" characteristic can be used to provide a user-friendly name for this instance of the lock mechanism service.

The associated light can be controlled using light bulb service 312. For instance, the light can be turned on or off by writing to the "On" characteristic, and the brightness of the light can be adjusted by writing to the "Brightness" characteristic. These characteristics may also be read to determine the current state of the light. In some embodiments, reading and/or writing to these characteristics can be limited to authorized controllers within a pair-verified session. Further, secure read and/or write operations, examples of which are described below, can be used for added security. The "Name" characteristic can be used to provide a user-friendly name for this instance of the light bulb service.

Accessory information service 314 and protocol information service 316 can include read-only characteristics that provide additional information about the accessory to a controller. For example, accessory information service 314 can include characteristics corresponding to the name of the accessory manufacturer, the accessory model, a serial number of the accessory, and an accessory name. Protocol information service 316 can indicate the version of the uniform accessory protocol implemented by the accessory and a minimum compatible version of the uniform accessory protocol. A controller can read the characteristics of protocol information service 316 to determine whether it can interoperate with the accessory. In some embodiments, all accessories that communicate using the uniform accessory protocol with Bluetooth LE transport may be required to provide accessory information service 314 and/or protocol information service 316. Services 314 and 316 are examples of "ancillary" services that can be defined to facilitate communication between a controller and an accessory. Other ancillary services can include, e.g., a "pairing" service usable to perform pair setup and pair verify processes.

Characteristics in GATT database 300 can also have other associated descriptors that define or describe various properties of the characteristic. For example, descriptors for a characteristic can include a user-readable description, a presentation format, a valid range of values, a step size, and so on. In some embodiments, a characteristic can also have an associated "UAP properties" descriptor that can specify how the characteristic can be accessed using the uniform accessory protocol. For instance, the UAP properties descriptor can include a bit mask, with various bits assigned to indicate properties such as: whether the characteristic supports read and/or write access; whether the characteristic can be (or must be) read and/or written using secure read and/or write procedures (e.g., as described below); whether a timed write procedure (e.g., as described below) is required when writing to the characteristic; whether the characteristic provides notifications of state updates when the accessory is not connected to the controller; and so on. In some embodiments, some or all of the associated descriptors for a characteristic can be communicated outside a pair-verified session, e.g., using a conventional Bluetooth LE GATT database read request.

In some embodiments, some or all of a characteristic's descriptors can be designated as "sensitive." For example, a characteristic may be assigned a type, a format, and so on, from which the purpose or function of a particular characteristic might be inferred (e.g., that the characteristic pertains to the state of a lock mechanism). In some embodiments, communication of sensitive descriptors by the accessory to a controller may be restricted such that the controller can only access sensitive descriptors using a signature read procedure, examples of which are described below. Thus, an unauthorized controller may be able to determine the number of services and/or characteristics of an accessory but may not be able to determine how the services and/or characteristics map to accessory functionality.

It is to be understood that the attribute database and descriptors described herein are illustrative and that variations and modifications are possible. An accessory's attribute database can include any number of services, and a service can have any number of characteristics. The set of descriptors associated with a given characteristic can be modified as desired, and any or all of a characteristic's associated descriptors can be treated as sensitive. In some embodiments, the designation of a particular characteristic as sensitive can be made on a per-characteristic basis. If desired, a non-sensitive descriptor can be provided for each characteristic to indicate whether sensitive descriptors exist for that characteristic; this can be done without indicating what the sensitive descriptors are.

Example Secure Read Processes

It may be desirable to protect sensitive descriptors and/or other content of an attribute database for an accessory, by limiting access to authorized controllers. Some transports used for UAP communication may provide inherent security. For example, where attributes are represented using JSON objects communicated using HTTP requests (e.g., GET and POST) and responses, the JSON objects can be encrypted and digitally signed at the sending endpoint and decrypted and verified at the receiving endpoint (e.g., using session keys of a pair-verified session as described above).

Not all transports provide this security, and accordingly, some embodiments of the present invention provide a uniform accessory protocol having secure read procedures that can be used by a controller to securely read sensitive portions of an attribute database of an accessory via a transport such as Bluetooth LE. The secure read procedures can allow the controller to read characteristic values and sensitive descriptors of a target characteristic. The read request can be formatted such that the accessory can verify that it originated from an authorized controller, and the data sent in response can be encrypted and digitally signed at the UAP layer, providing additional protection against eavesdroppers.

Figure 4:
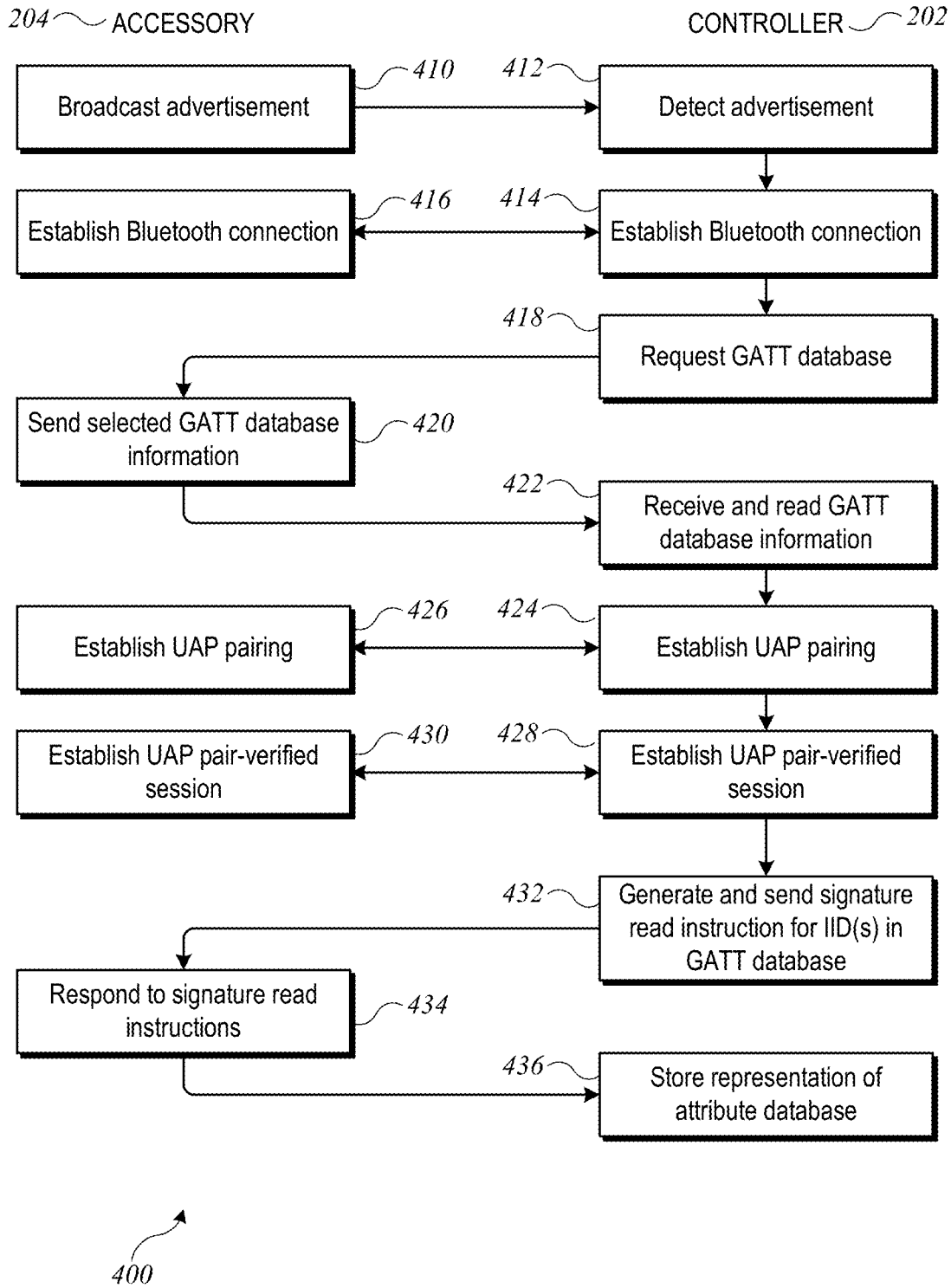
FIG. 4 shows a flow diagram of a process for performing discovery and connection between a controller and an accessory according to an embodiment of the present invention.

In some embodiments, one secure read procedure can be a "signature read" procedure that is usable to read sensitive descriptors for an attribute database, e.g., during device discovery and initial connection. FIG. 4 shows a flow diagram of a process 400 for performing discovery and connection between a controller and an accessory according to an embodiment of the present invention. Portions of process 400 can be performed by a controller (e.g., any of controllers 202 of FIG. 2), and other portions of process 400 can be performed by an accessory (e.g., any of accessories 204 of FIG. 2). In some embodiments, the controller and accessory can use Bluetooth LE as a transport; other transports can be substituted.

For purposes of description, it is assumed that accessory 204 and controller 202 have not previously communicated. At block 410, accessory 204 can broadcast an advertisement. In some embodiments, the advertisement can conform to a Bluetooth LE protocol and can include information about accessory 204, e.g., an identifier of one of the services included in a GATT database for accessory 204. At block 412, controller 202 can detect the advertisement and determine that a connection to the accessory should be established. For example, controller 202 can present information from the detected advertisement to a user and obtain user input indicating that a connection should be established. At blocks 414 and 416, a connection (e.g., a Bluetooth connection) can be established; conventional techniques can be used at this stage.

At block 418, controller 202 can request the GATT database from accessory 204, e.g., using one or more conventional Bluetooth LE GATT read requests. At block 420, accessory 204 can respond to the request, e.g., by sending selected GATT database information to controller 202. The selected information can include, e.g., the instance IDs and UUIDs of various services and characteristics, as well as selected descriptors, including, e.g., the UAP properties descriptor. In some embodiments, the selected information can exclude sensitive information (e.g., type descriptors, other sensitive descriptors, and/or values of some or all of the characteristics).

At block 422, controller 202 can receive and read the selected GATT database information provided by the accessory. Based on this information, controller 202 can determine whether to establish a uniform accessory protocol pairing with accessory 204. For instance, the selected GATT database information provided at block 420 can include information about the pairing status of the accessory (e.g., whether it already has a uniform accessory protocol pairing with another controller), and this information can be used in the determination.

Assuming that controller 202 determines that a uniform accessory protocol pairing should be established, at blocks 424 and 426, controller 202 and accessory 204 can establish a uniform accessory protocol pairing, e.g., using a pair setup process as described above. As described above, pair setup can include securely exchanging long-term public keys that can be used to authenticate accessory 204 to controller 202 and vice versa upon subsequent reconnection. Assuming the pairing is successfully established, at blocks 428 and 430, controller 202 and accessory 204 can establish a uniform accessory protocol pair-verified session, e.g., using a pair verify process as described above. As described above, pair verify can include mutual authentication and establishing a short-term shared secret from which session keys can be generated. Within the pair verified session, the session keys can be used to encrypt communications between controller 202 and accessory 204, providing trust as to both the source of the communication and the absence of any tampering with the original message. It should be understood that after the initial connection and pair setup, the pair verify process can be performed upon a subsequent reconnection without repeating the pair setup process.

Once a pair-verified session has been established, controller 202 can securely obtain the rest of the attribute database information from accessory 204. For example, at block 432, controller 202 can generate and send a "signature read" instruction to accessory 204 using each instance ID in the GATT database. (The instance IDs are assumed to be in the portion of the GATT database that was sent by accessory 204 at block 420 and are thus known to controller 202 prior to any signature read requests.) The signature read instruction can include a block of data that is encrypted and signed by controller 202 using a session key of the UAP pair-verified session. This can allow accessory 204 to confirm that the request originated from controller 202. At block 434, accessory 204 can generate and send a response to the signature read instruction. In some embodiments, the response can include a data block representing the requested information for the characteristic and additional information usable by controller 202 to verify that the response is responsive to a specific signature read instruction. This data block can be encrypted and signed by accessory 204 using a session key of the UAP pair-verified session. This can allow controller 202 to confirm that the response originated from accessory 204 and that the data has not been modified. An example implementation of a signature read procedure using a Bluetooth LE transport is described below.

At block 436, controller 202 can store an internal representation of the accessory's attribute database. This representation can include the GATT database information obtained at block 422 as well as the additional information obtained from the signature read response at block 434.

Figure 5:
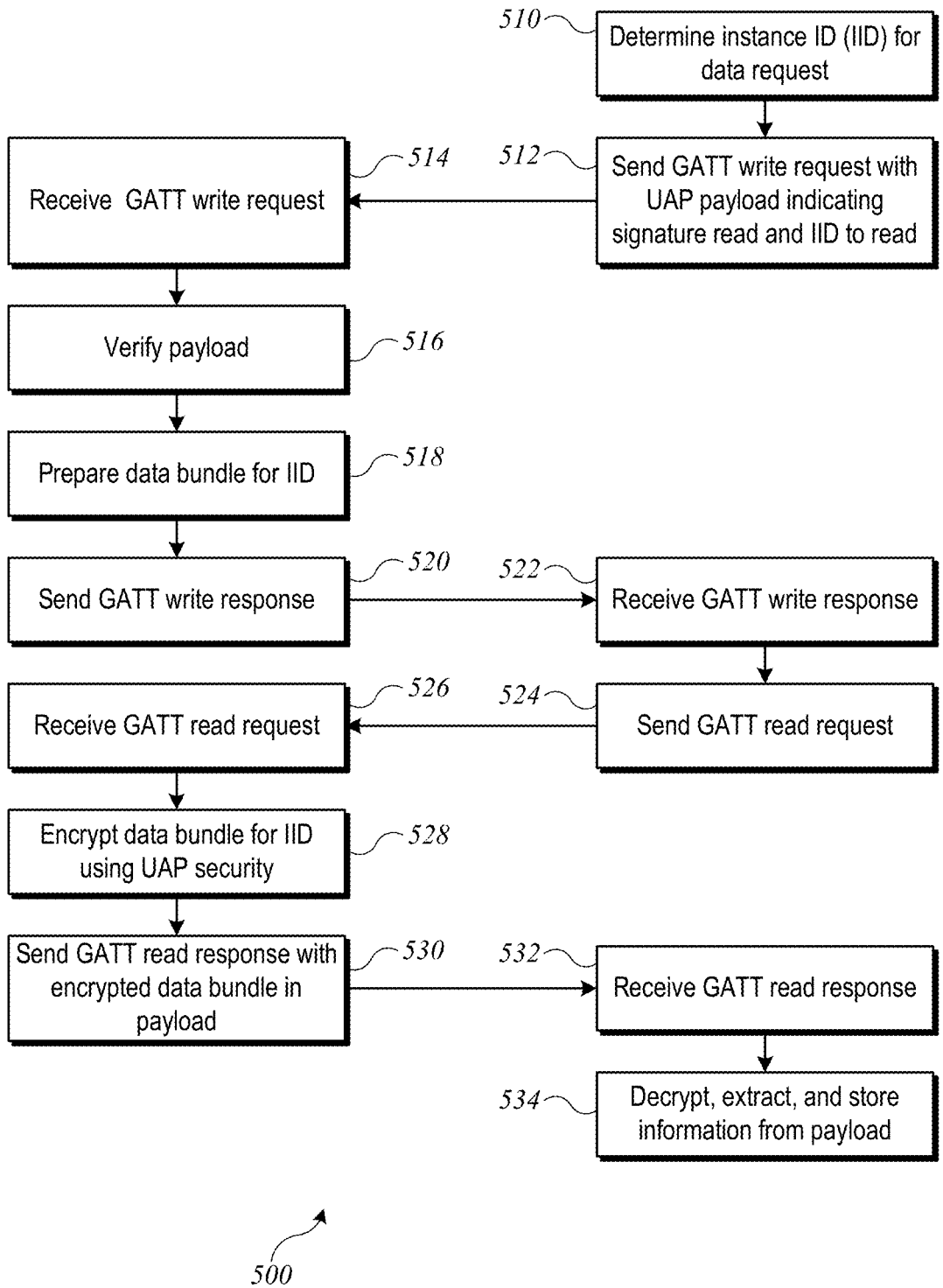
FIG. 5 shows a flow diagram of a process for performing a signature read procedure according to an embodiment of the present invention.

In some embodiments, a signature read procedure can be implemented using specially formatted GATT write and read requests and responses. FIG. 5 shows a flow diagram of a process 500 for performing a signature read procedure according to an embodiment of the present invention. Process 500 can be used, e.g., at blocks 432 and 434 of process 400 described above.

At block 510, controller 202 can determine an instance ID of a characteristic for which a signature read procedure is desired. It is to be understood that a signature read procedure may not be useful for all characteristics and/or services. For instance, referring to FIG. 3, accessory information service 314 and/or protocol information service 316 can be constructed such that complete information about their characteristics is provided during the initial GATT database read (e.g., at blocks 418-422 of process 400), in which case a subsequent signature read procedure will not yield any additional information. Services such as light bulb service 312 and/or lock mechanism service 310 may include one or more items of sensitive information, for which a signature read can provide additional information.

At block 512, controller 202 can send a GATT write request to accessory 204. In some embodiments, the GATT write request can be formatted consistently with Bluetooth LE standards, including a characteristic UUID of the target characteristic. The payload, instead of containing data to be written to the target characteristic, can include an encrypted and signed data bundle that contains information usable by the accessory to process a signature read. For example, the encrypted data bundle can include: (1) an opcode token identifying the request as a signature read request; (2) a transaction identifier (ID), which can be a random number assigned by controller 202 to this transaction; and (3) the instance ID of the targeted characteristic. The data bundle can be encrypted and signed using a session key of the pair-verified session between controller 202 and accessory 204. A GATT write request is used to implement the signature read instruction because Bluetooth LE standards provide that a GATT read request has an empty payload. At block 514, accessory 204 can receive the GATT write request.

At block 516, accessory 204 can extract and verify the payload. For example, the accessory can decrypt the encrypted data bundle and parse its contents, e.g., extracting the signature read opcode token, the transaction ID, and the instance ID of the target characteristic (which should correspond to the target characteristic UUID in the GATT write request).

Assuming that the payload is correctly decrypted and parsed, at block 518, accessory 204 can prepare a data bundle to be sent to controller 402 to complete the signature read procedure. This data bundle can include, for example: (1) a transaction ID, which can be the same transaction ID that was included in the GATT write payload; (2) the instance ID of the target characteristic; (3) one or more TLVs (type-length-value) providing the current value and additional descriptors (e.g., type) for the target characteristic; and/or (4) a status indicator for the request (e.g., indicating success or error).

At block 520, accessory 204 can send a GATT write response to controller 202. In some embodiments, the GATT write response can just include a status indicator (e.g., indicating whether accessory 204 is able to return data). The GATT write response does not include the data bundle prepared at block 518. At block 522, controller 202 can receive the GATT write response.

At block 524, in response to receiving the GATT write response, controller 202 can send a GATT read request to the same target characteristic UUID. As with standard Bluetooth LE GATT read requests, this request can have an empty payload. At block 526, accessory 204 can receive the GATT read request. Given that a signature read procedure is in progress for the target characteristic, accessory 204 can interpret the GATT read request as a request to receive the data bundle for the target characteristic.

At block 528, accessory 204 can encrypt the data bundle that was generated at block 518 using a session key of the pair-verified session. At block 530, accessory 204 can send a GATT read response to controller 202, with the encrypted data bundle as payload.

At block 532, controller 202 can receive the GATT read response. At block 534, controller 204 can decrypt the data bundle, extract the information, and store the extracted information in its local representation of the accessory's attribute database. Process 500 can be repeated for each instance ID for which a signature read procedure is desired.

A signature read procedure such as process 500 can provide various security enhancements relative to conventional Bluetooth LE GATT read operations. For example, as noted above, the encryption of information about the target characteristics can prevent eavesdroppers from learning which characteristics correspond to which aspects of accessory state. In addition, process 500 includes controller 202 sending a data bundle to accessory 204 that has been encrypted and signed using a session key known only to accessory 204 and controller 202. This can allow accessory 204 to verify that the signature read instruction originated from controller 202. As another example, the information sent by accessory 204 in response to a signature read instruction can be encrypted and signed using a session key that is known only to controller 202 and accessory 204, making it less likely that the information could be used by any eavesdropper. Further, the signature by accessory 204 using the session key provides an assurance to controller 202 that the information originated from accessory 204 and not an impostor. In addition, the inclusion of a transaction ID that is selected by the controller and returned by the accessory can provide further confirmation that the accessory received and is responding to a specific request. Other security measures can also be implemented. For instance, in some embodiments, accessory 204 can decline to send the encrypted data bundle if the GATT read request is not received (block 526) within a specified timeout period after accessory 204 sends the GATT write response (block 520), and/or controller 202 can decline to send the GATT read request (block 524) if the GATT write response is not received (block 522) within a specified timeout period after controller 202 sends the GATT write request. Such timing constraints can reduce the opportunity for an interloper to meddle with a request and/or response.

It should also be noted that after process 400 has been executed, controller 202 can use a secure read procedure similar to process 500 to read just the current value of a characteristic. In the case of a secure read, accessory 204 can return less information (e.g., only the current value of the targeted characteristic, without including any other descriptors). A secure read can be distinguished from a signature read, e.g., by including a different opcode token in the encrypted data bundle for the GATT write request generated by the controller.

Some embodiments may support an "unsecured" signature read procedure that allows the accessory to send information without first establishing a UAP pair-verified session. For instance, the accessory and the controller can use some other technique to establish a shared secret that can be used to encrypt and sign payloads for requests and/or responses. The shared secret can include a shared secret established as part of the Bluetooth LE connection process or some other shared secret derived therefrom. Unsecured signature read may be used, for instance, by a tunnel device; an example is described below. In some embodiments, the accessory can be configured to either accept or reject unsecured signature read requests, and the determination whether to accept or reject an unsecured signature read request can be based on information provided by the requesting device (e.g., the controller or tunnel).

Those skilled in the art will appreciate that processes 400 and 500 are illustrative and that other variations and modifications are also possible. The particular content and formatting of data bundles can be modified as desired.

Example Secure Write Processes

As noted above, a controller can change the state of an accessory by writing a new value to a characteristic in the accessory's attribute database. It is to be understood that not all characteristics in an accessory's attribute database need be writeable by a controller; in some embodiments, only characteristics corresponding to aspects of state that an authorized controller is permitted to change may be writeable, while other characteristics can be read-only. (It is, of course, desirable to prevent unauthorized controllers from writing to any characteristics.)

Figure 6:
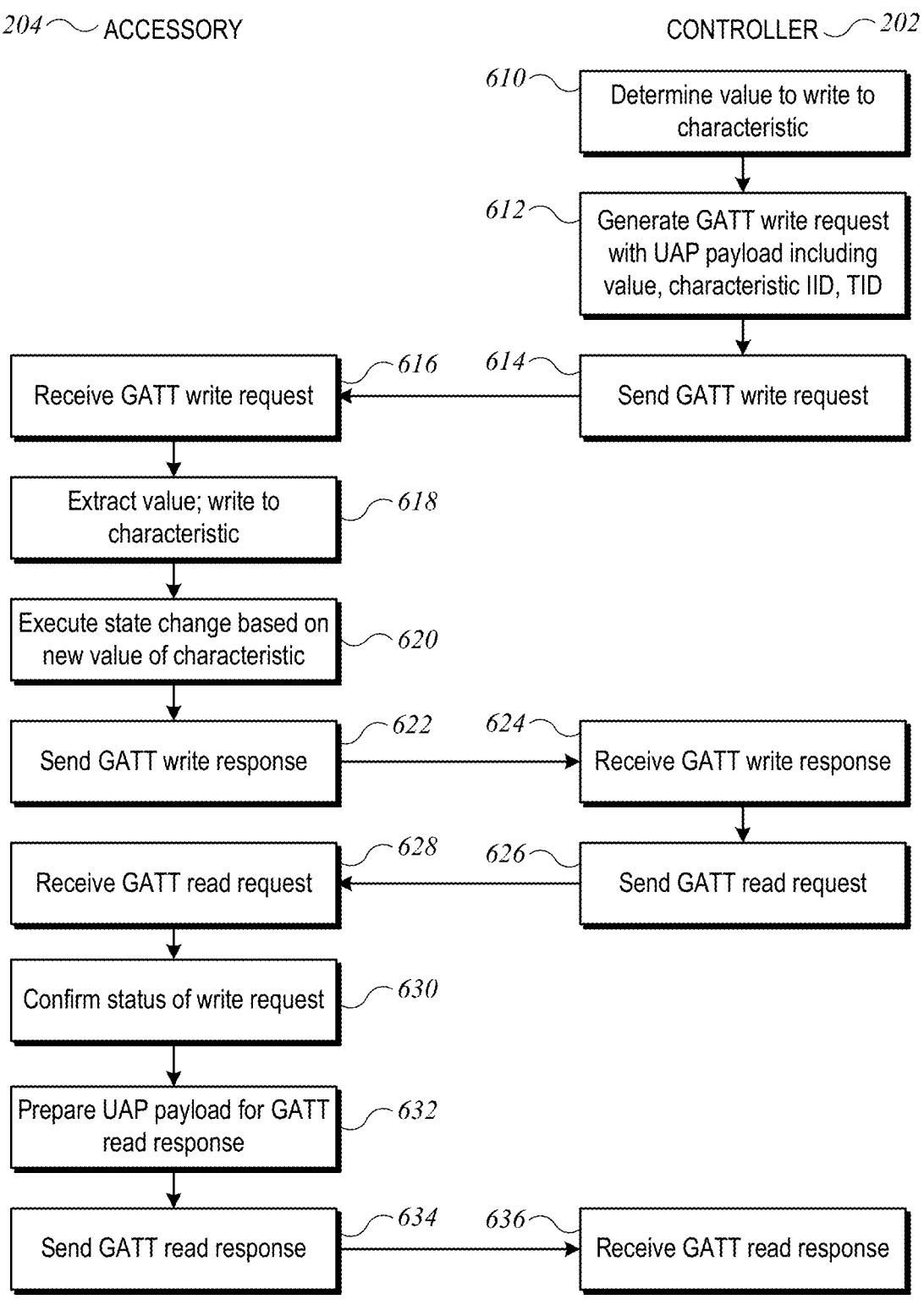
FIG. 6 shows a flow diagram of a process for performing a secure write procedure according to an embodiment of the present invention.

In some embodiments, a secure write procedure can be used to enhance security when a controller writes to an accessory characteristic. FIG. 6 shows a flow diagram of a process 600 for performing a secure write procedure according to an embodiment of the present invention. Process 600 can be used whenever a controller (e.g., any of controllers 202 of FIG. 2) determines that a value should be written to a characteristic of an accessory (e.g., any of accessories 204 of FIG. 2). Portions of process 600 can be performed by a controller (e.g., any of controllers 202 of FIG. 2), and other portions of process 600 can be performed by an accessory (e.g., any of accessories 204 of FIG. 2). In some embodiments, the controller and accessory can use Bluetooth LE as a transport; other transports can be substituted. It is assumed that process 600 is executed at a time when controller 202 and accessory 204 have established a pair-verified session.

At block 610, controller 202 can determine a value to write to a particular characteristic. For example, referring to FIG. 3, controller 202 may receive user input indicating that a door is to be locked and can determine that locking the door can be accomplished by writing a value of "true" to the TargetState characteristic of lock mechanism service 310. (It is to be understood that all write processes described herein are generally applicable to writing a value to any characteristic for which controller 202 has write permission.)

At block 612, controller 202 can generate a GATT write request to accessory 204. In some embodiments, the GATT write request can be formatted consistently with Bluetooth LE standards, including a characteristic UUID of the target characteristic. The payload can contain an encrypted data bundle that contains the value to be written to the target characteristic (also referred to as the "write data") as well as information usable by the accessory to verify the source of the write data. For example, the encrypted data bundle can include: (1) an opcode token identifying the request as a secure write request; (2) a transaction ID, which can be a random number assigned by controller 202 to this transaction; (3) the instance ID of the target characteristic; and (4) the write data. The data bundle can be encrypted using the session key of the pair-verified session between controller 202 and accessory 204. At block 614, controller 202 can send the GATT write request to accessory 204.

At block 616, accessory 204 can receive the GATT write request. At block 618, accessory 204 can decrypt the data bundle, extract the value, and write the extracted value to the target characteristic. At block 620, accessory 204 can perform any actions needed to update the state of the accessory based on the new value of the target characteristic. For example, if the request is a request to write the value of "true" to the TargetState characteristic of lock mechanism service 310, accessory 204 can initiate a physical action to lock the door (e.g., operating an actuator to turn a mechanical lock, enabling a magnetic lock, etc.).

At block 622, accessory 204 can send a response to the GATT write request. In some embodiments, the response can include a status indicator (e.g., indicating whether accessory 204 wrote the data successfully). At block 624, controller 202 can receive the GATT write response.

In some embodiments, a secure write procedure an include a signed confirmation from accessory 204. For instance, at block 626, in response to receiving the GATT write response, controller 202 can send a GATT read request to the same target characteristic UUID. As with standard Bluetooth LE GATT read requests, this request can have an empty payload. At block 628, accessory 204 can receive the GATT read request. Given that a secure write procedure is in progress for the target characteristic, accessory 204 can interpret the GATT read request as a request for a signed confirmation of the write operation.

At block 630, accessory 204 can confirm the status of the secure write request. At block 632, accessory 204 can prepare a payload for a response to the GATT write request. The payload can include, e.g., a data bundle that is encrypted using a session key of the pair-verified session. The data bundle can include, for example: (1) the transaction ID that was received in the GATT write request; and (2) status information indicating whether the request completed successfully. At block 634, accessory 204 can send the GATT read response with the encrypted data bundle as payload. At block 636, controller 202 can receive the GATT read response. Controller 202 can decrypt the encrypted data bundle and verify that accessory 204 received and completed the write request. The use of a GATT read request following the GATT write request allows the accessory to send a signed confirmation that it received and executed the write request. Inclusion of a transaction ID that is selected by the controller and returned by the accessory provides assurance that the accessory received and responded to the correct request. Additional security measures can also be implemented.

In some embodiments, further security can be provided using a timed write procedure (which can be an example of a secure write procedure). A timed write procedure, also referred to as a "prepared write" procedure, can impose time constraints within which a write operation needs to be completed. For instance, a controller can send a first instruction to the accessory that includes the data to be written, receive the accessory's signed confirmation of receipt of the first instruction, then send a second instruction to the accessory to write the previously-sent data. In response to the first instruction, the accessory can cache (temporarily store) the data to be written without writing the data to the target characteristic, and in response to the second instruction, the accessory can write the cached data to the target characteristic. The accessory and/or controller can impose time constraints on when various instructions and/or responses need to be received relative to each other. Timed write procedures can be used in connection with any transport.

Figure 7:
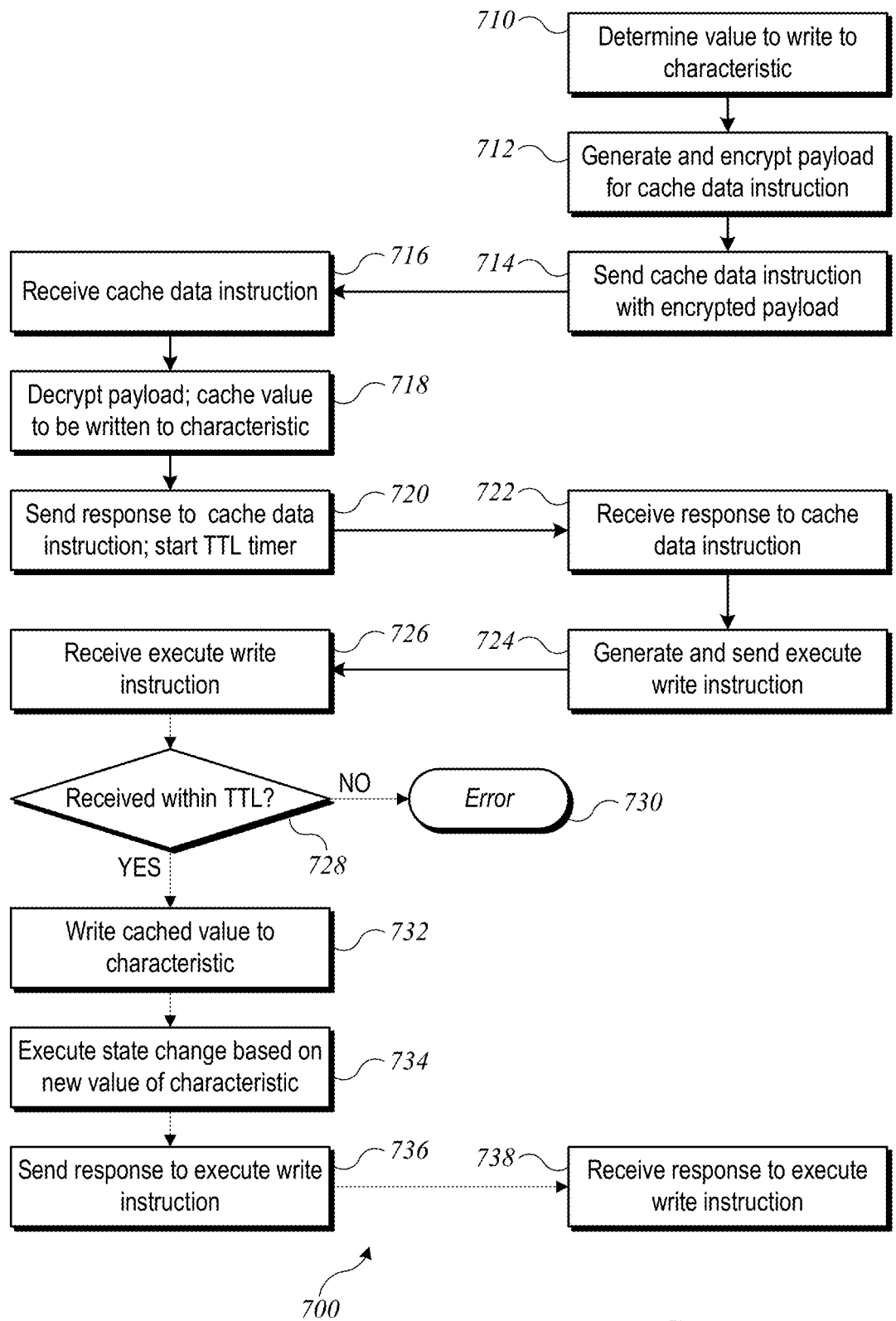
FIG. 7 shows a flow diagram of a process for a timed write procedure according to an embodiment of the present invention.

FIG. 7 shows a flow diagram of a process 700 for a timed write procedure according to an embodiment of the present invention. Process 700 can be used whenever a controller (e.g., any of controllers 202 of FIG. 2) determines that a value should be written to a characteristic of an accessory (e.g., any of accessories 204 of FIG. 2). Portions of process 700 can be performed by a controller (e.g., any of controllers 202 of FIG. 2), and other portions of process 700 can be performed by an accessory (e.g., any of accessories 204 of FIG. 2). In some embodiments, the controller and accessory can use Bluetooth LE as a transport; other transports can be substituted. It is assumed that process 700 is executed at a time when controller 202 and accessory 204 have established a pair-verified session.

At block 710, controller 202 can determine a value to write to a particular characteristic. For example, referring to FIG. 3, controller 202 may receive user input indicating that a door is to be locked and can determine that locking the door can be accomplished by writing a value of "true" to the TargetState characteristic of lock mechanism service 310.

At block 712, controller 202 can generate a UAP payload for a "cache data" instruction to accessory 204. In some embodiments, the cache data instruction can be sent using a GATT write request; an example is described below. In other embodiments, the cache data instruction can be sent by sending an HTTP post request to an appropriate URL defined at accessory 204; an example is described below. The UAP payload can contain an encrypted and signed data bundle that includes the value to be written (also referred to as the write data) as well as information usable by the accessory to verify the source of the write data. For example, the encrypted data bundle can include: (1) an opcode token identifying the request as a cache data instruction; (2) a transaction ID, which can be a random number assigned by controller 202 to this transaction; (3) the instance ID of the target characteristic; (4) the write data; and (5) a "time to live" (or "TTL") parameter. However, in some examples, the data bundle may not include the write data. Instead, as described below, the write data may be provided at a later point in the process. The data bundle can be encrypted and signed using a session key of the pair-verified session between controller 202 and accessory 204. At block 714, controller 202 can send the cache data instruction to accessory 204.

At block 716, accessory 204 can receive the cache data instruction. At block 718, accessory 204 can decrypt the data bundle, extract the write data, and cache the write data. In this embodiment, accessory 204 does not actually write any data to any characteristic in response to the cache data instruction. Instead, accessory 204 can store the write data as "pending" write data in a buffer or other temporary storage, in association with an identifier of the target characteristic. Actual writing to the characteristic can occur later, as described below. Accessory 204 can also extract the TTL parameter. Alternatively, as noted above, the write data may not be part of the bundle. In which case, accessory 204 cannot write any data to any characteristics, since the data has not yet been received. Instead, the other portions of the bundle can be cached, and accessory 204 will be informed that the data will be provided later.

At block 720, accessory 204 can send a response to the cache data instruction to controller 204. In some embodiments, sending the response can be accomplished using a GATT read request and response; an example is described below. In some embodiments, sending the response can be accomplished using an HTTP response message; an example is described below. In some embodiments, accessory 204 can start a TTL timer upon sending the response to the cache data instruction.

At block 722, controller 202 can receive the response to the cache data instruction. In some embodiments, the response can include a signed verification from the accessory that the write data was received (if it was included in the data bundle); examples are described below. At block 724, in response to receiving the accessory's response, controller 202 can generate and send an "execute write" instruction to the accessory. The execute write instruction can include, as a payload, an encrypted and signed data bundle usable by the accessory to validate the execute write instruction. For example, the encrypted and signed data bundle can include: (1) an opcode token identifying the request as an execute write request; (2) a transaction ID, which can be a random number assigned by controller 202 to this transaction and which can be the same as or different from the transaction ID of the preceding cache data instruction; and (3) the instance ID of the target characteristic. In this embodiment, the data bundle for an execute write instruction does not include the data to be written. However, in the example above, where the data to be written was not included in the original bundle received by accessory 204 at 716, the data may instead be included in the data bundle received by accessory 204 at 726 (e.g., along with the execute write instruction). The data bundle can be encrypted using a session key of the pair-verified session between controller 202 and accessory 204. In some embodiments, the execute write instruction can be sent using a GATT write request; an example is described below. In other embodiments, the execute write request can be sent using an HTTP POST request to an appropriate URL defined at accessory 204; an example is described below.

At block 726, accessory 204 can receive the execute write instruction. At block 728, accessory 204 can determine whether the execute write instruction was received prior to expiration of the TTL timer that was started at block 720. In some embodiments, the determination can be based on the TTL parameter that accessory 204 received in the cache data instruction. For example, the TTL parameter can specify a time to live in seconds (e.g., 0.5 seconds, 1 second, 2.5 seconds, 5 seconds, etc.), and accessory 204 can determine from the TTL timer whether the specified time to live has elapsed. If the specified time to live has elapsed, then the execute write instruction is not received within the time to live, and process 700 can end with an error at block 730. In some embodiments, accessory 204 can send an error message to controller 202.

If, at block 728, the execute write instruction is received within the time to live (e.g., prior to expiration of the TTL timer), then accessory 204 can execute the write operation. For example, at block 732, accessory 204 can write the previously cached data value (from block 718) to the target characteristic. At block 734, accessory 204 can perform any actions needed to update the state of the accessory based on the new value of the target characteristic; this can be similar to block 620 of process 600 described above. In some embodiments, execution of the write operation can be contingent upon additional validation operations. For instance, accessory 204 can validate the signature of controller 202 and confirm that the target characteristic identifier extracted from the payload of the execute write instruction corresponds to the target characteristic identifier of the cache data instruction.

At block 736, accessory 204 can send a response to the execute write instruction to controller 204. In some embodiments, sending the response can be accomplished using a GATT read request and response; an example is described below. In other embodiments, the response can be sent as an HTTP response to the POST request; an example is described below. At block 738, controller 202 can receive the response to the execute write instruction. In some embodiments, controller 202 can use information included in the response to verify that the accessory has executed the write operation successfully.

It should be noted that other timeouts can also be imposed during the timed write procedure. For instance, controller 204 can require that the response to the cache data instruction be received (block 722) within a specific timeout period after sending the cache data instruction (block 714). This timeout can be, e.g., 2 seconds, 5 seconds, 10 seconds, or some other period. Additionally or instead, controller 204 can require that the response to the execute write instruction be received (block 738) within a specific timeout period after sending the execute write instruction (block 724). This timeout can be, e.g., 2 seconds, 5 seconds, 10 seconds, or some other period; the timeout periods for different segments of the timed write procedure can be the same or different as desired. Use of timeout periods can help to prevent exploits based on delaying transmission of messages from the controller to the accessory or vice versa. In some embodiments, use of the timed write procedure can be selectively required by the accessory for certain characteristics. For instance, referring to FIG. 3, a timed write procedure might be required when writing to the TargetState characteristic of lock mechanism service 310 but not when writing to the On or Brightness characteristic of light bulb service 312. In some embodiments, the accessory can specify which characteristics require a timed write procedure, e.g., by setting an appropriate bit in the UAP properties descriptor bitmask as described above. Where a characteristic requires a timed write procedure, the accessory can ignore any write request or instruction that does not conform to the timed write procedure.

Figure 8:
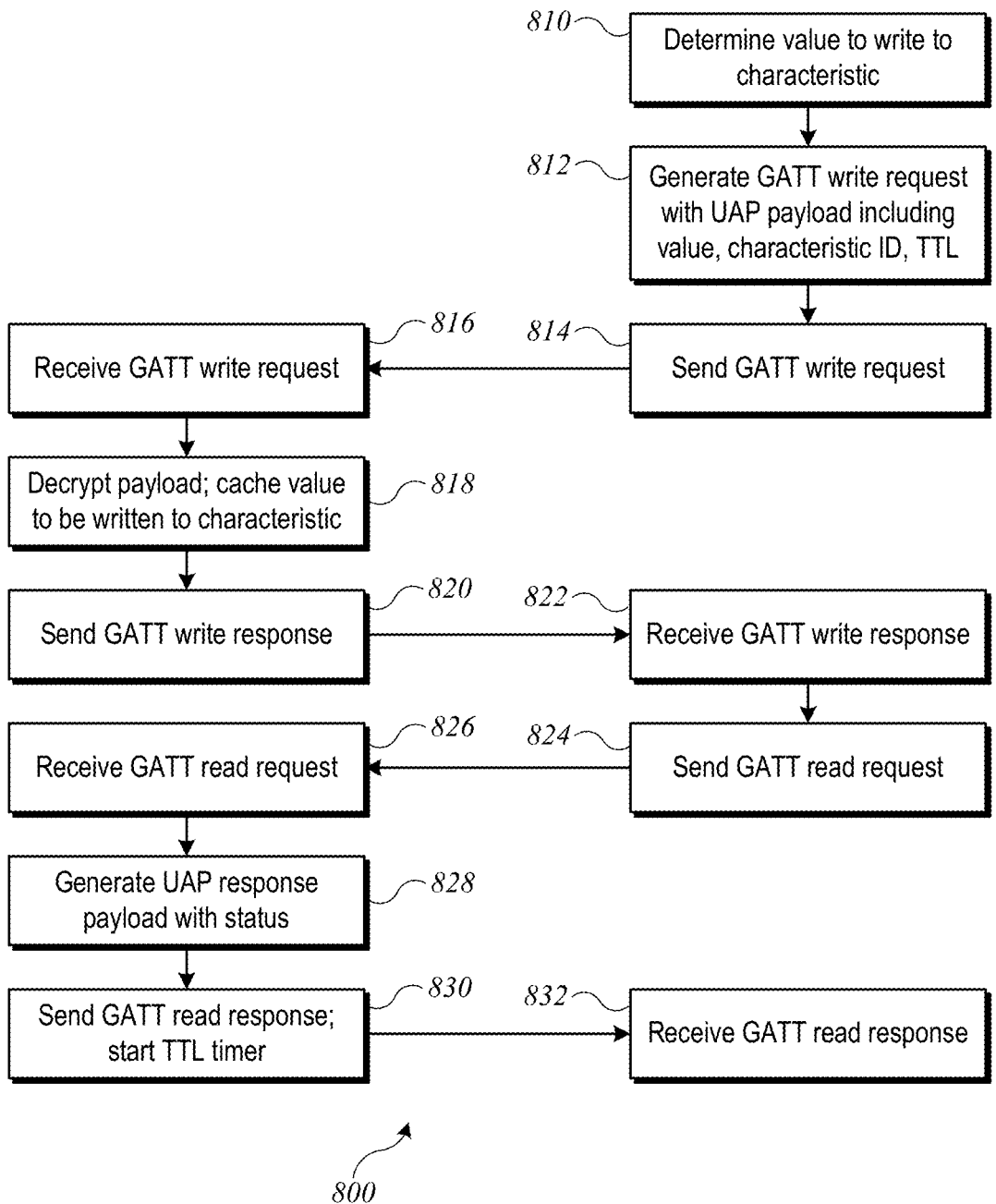
FIG. 8 shows a flow diagram of a process implementing a cache data instruction for a timed write procedure according to an embodiment of the present invention.

In some embodiments, the cache data instruction and the execute write instruction can be implemented using Bluetooth LE GATT read and write requests. FIG. 8 shows a flow diagram of a process 800 implementing a cache data instruction for a timed write procedure according to an embodiment of the present invention. Portions of process 800 can be performed by a controller (e.g., any of controllers 202 of FIG. 2), and other portions of process 800 can be performed by an accessory (e.g., any of accessories 204 of FIG. 2). It is assumed that process 800 is executed at a time when controller 202 and accessory 204 have established a pair-verified session. Process 800 can be understood as a specific example of implementation of blocks 710-722 of process 700 in an embodiment where Bluetooth LE is the transport; however, process 800 can also be used with other transports.

At block 810, controller 202 can determine a value to write to a particular characteristic. This can be similar to block 710 of process 700 described above. At block 812, controller 202 can generate a GATT write request that includes a UAP payload (e.g., an encrypted data bundle). The GAT write request can identify the UUID of the target characteristic. The UAP payload can include the value to be written (also referred to as the write data) and a TTL parameter as well as information usable by the accessory to verify the source of the write data. For instance, any or all of the information described above with reference to block 712 of process 700 can be included. The UAP payload can be encrypted and signed using a session key of the pair-verified session between controller 202 and accessory 204. At block 814, controller 202 can send the GATT write request to accessory 204.

At block 816, accessory 204 can receive the GATT write request. At block 818, accessory 204 can decrypt the UAP payload, determine from the opcode that the message is a cache data instruction, extract the write data, cache the write data and an identifier of the target characteristic (e.g., either or both of the UUID and the instance ID), and extract the TTL parameter. It should be noted that in this embodiment, accessory 204 does not actually write data to any characteristic in response to the cache data instruction; this can be similar to block 718 of process 700.

At block 820, accessory 204 can send a GATT write response to controller 202. In some embodiments, the response can include a status indicator (e.g., indicating whether accessory 204 successfully parsed the UAP payload). At block 822, controller 202 can receive the GATT write response.

At block 824, in response to receiving the GATT write response, controller 202 can send a GATT read request to the same target characteristic UUID. As with standard Bluetooth LE GATT read requests, this request can have an empty payload. At block 826, accessory 204 can receive the GATT read request. Given that a cache data instruction of a timed write procedure was last received for this characteristic, accessory 204 can interpret the GATT read request as a request for a signed confirmation responsive to the cache data instruction.

At block 830, accessory 204 can generate a UAP payload for responding to the GATT read request. The UAP payload can include, e.g., a data bundle that is encrypted and signed using a session key of the pair-verified session. The data bundle can include, for example: (1) the transaction ID that was received in the GATT write request; and (2) status information indicating whether accessory 204 successfully processed the cache data instruction (which in this context does not mean data was written to the characteristic). At block 830, accessory 204 can send the GATT read response with the encrypted and signed data bundle as payload. At this time accessory 204 can start a TTL timer, similarly to block 720 of process 700 described above. At block 832, controller 202 can receive the GATT read response. In some embodiments, controller 202 can use the payload of the GATT read response to verify that the response originated from the accessory and that the cache data instruction has been carried out.

Upon completion of process 800, accessory 204 has received and cached write data and has confirmed receipt of the write data but has not yet executed the write. As described above, controller 202 can send a separate execute write instruction to instruct accessory 204 to execute the write.

Figure 9:
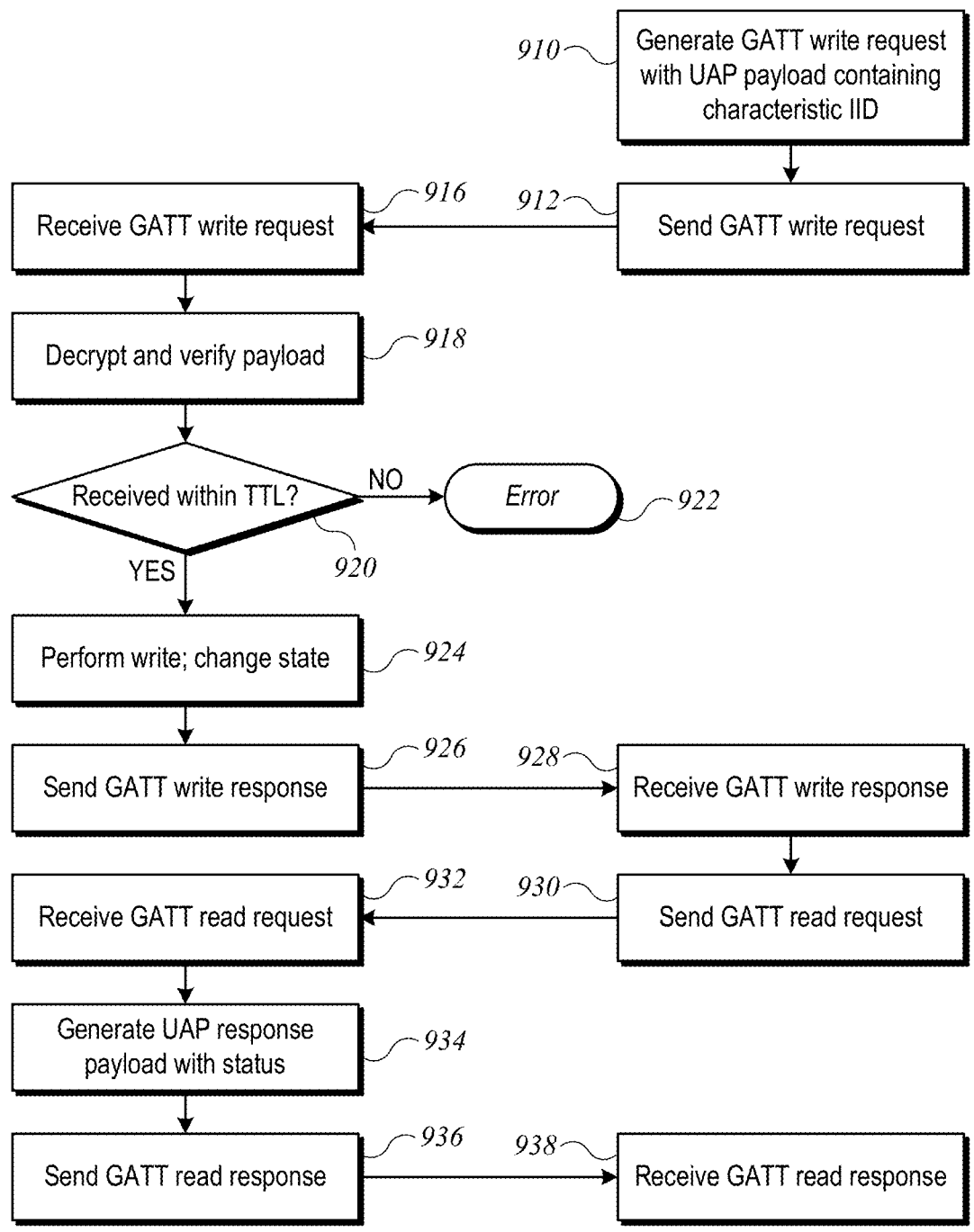
FIG. 9 shows a flow diagram of a process implementing an execute write instruction for a timed write procedure according to an embodiment of the present invention.

FIG. 9 shows a flow diagram of a process 900 implementing an execute write instruction for a timed write procedure according to an embodiment of the present invention. Portions of process 900 can be performed by a controller (e.g., any of controllers 202 of FIG. 2), and other portions of process 900 can be performed by an accessory (e.g., any of accessories 204 of FIG. 2). Process 900 can be executed in response to completion of process 800, while controller 202 and accessory 204 have a pair-verified session. Process 900 can be understood as a specific example of implementation of blocks 724-738 of process 700 in an embodiment where Bluetooth LE is the transport; however, process 900 can also be used with other transports.

Process 900 can begin when controller 202 has confirmed that accessory 204 received and processed a cache data instruction (e.g., using process 800). At block 910, controller 202 can generate a GATT write request that includes a UAP payload (e.g., an encrypted data bundle). The UAP payload can include, e.g., any or all of the information described above with reference to block 724 of process 700. The UAP payload can be encrypted using a session key of the pair-verified session between controller 202 and accessory 204. At block 912, controller 202 can send the GATT write request to accessory 204.

At block 916, accessory 204 can receive the GATT write request. At block 918, accessory 204 can decrypt and verify the UAP payload and can determine from the opcode token that the GATT write request corresponds to an execute write instruction. At block 920, accessory 204 can determine whether the execute write instruction was received prior to expiration of the TTL timer that was started in response to the previous cache data instruction (e.g., at block 830 of process 800). This determination can be similar to block 728 of process 700 described above. If the execute write instruction is not received within the time to live, process 900 can end with an error at block 922. In some embodiments, accessory 204 can send an error message to controller 202.

If, at block 920, the execute write request is received prior to expiration of the TTL timer, then at block 924, accessory 204 can perform the write and execute any associated state changes. This can be similar to blocks 732 and 734 of process 700 described above.

At block 926, accessory 204 can send a GATT write response to controller 202. In some embodiments, the GATT write response can include a status indicator (e.g., indicating whether accessory 204 wrote the data and/or updated the state successfully). At block 928, controller 202 can receive the GATT write response.

At block 930, in response to receiving the GATT write response, controller 202 can send a GATT read request to the same characteristic UUID. As with standard Bluetooth LE GATT read requests, this request can have an empty payload. At block 932, accessory 204 can receive the GATT read request. Given that an execute write instruction of a timed write procedure was last received for this characteristic, accessory 204 can interpret the GATT read request as a request for a signed confirmation responsive to the execute write instruction.

At block 934, accessory 204 can generate a UAP payload for responding to the GATT read request. The UAP payload can include, e.g., a data bundle that is encrypted and signed using a session key of the pair-verified session. The UAP payload can include, for example: (1) the transaction ID that was received in the GATT write request; and (2) status information indicating whether accessory 204 successfully processed the cache data instruction. At block 936, accessory 204 can send the GATT read response with the encrypted data bundle as payload. At block 938, controller 202 can receive the GATT read response. In some embodiments, controller 202 can use the payload of the GATT read response to verify that the response originated from the accessory and that the execute write instruction has been carried out.

Figure 10:
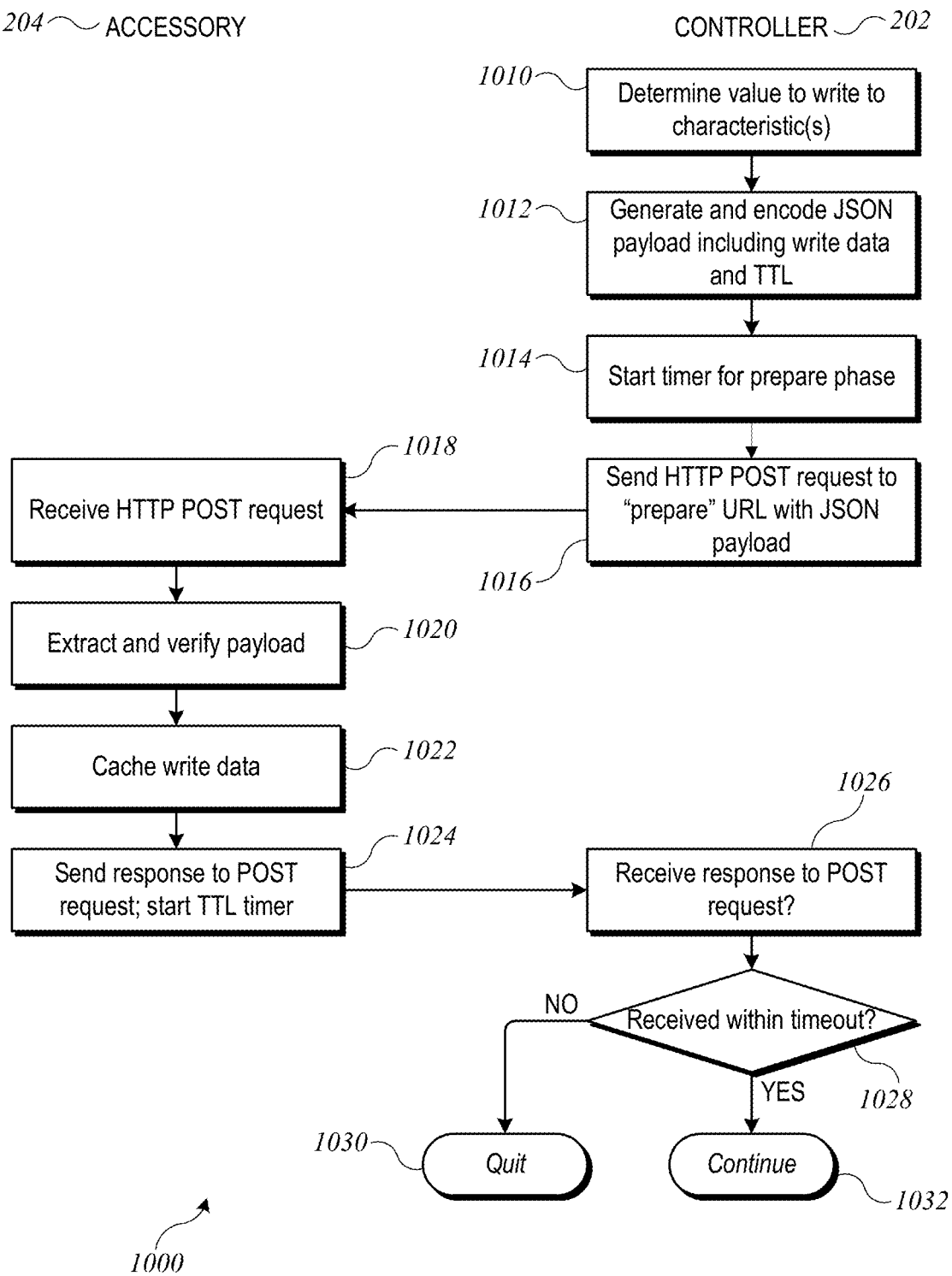
FIG. 10 shows a flow diagram of a process implementing a cache data instruction for a timed write procedure according to an embodiment of the present invention.

In other embodiments, the cache data instruction and the execute write instruction can be implemented using HTTP POST requests. FIG. 10 shows a flow diagram of a process 1000 implementing a cache data instruction for a timed write procedure according to an embodiment of the present invention. Portions of process 1000 can be performed by a controller (e.g., any of controllers 202 of FIG. 2), and other portions of process 1000 can be performed by an accessory (e.g., any of accessories 204 of FIG. 2). It is assumed that process 1000 is executed at a time when controller 202 and accessory 204 have established a pair-verified session. Process 1000 can be understood as a specific example of implementation of blocks 710-722 of process 700 in an embodiment where HTTP/IP is the transport; however, process 1000 can also be used with other transports.

At block 1010, controller 202 can determine a value to write to a particular characteristic or one or more particular characteristics (e.g., using HTTP POST requests, multiple characteristics can be written to in a single instruction/request). This can be similar to block 710 of process 700 described above. In some embodiments, a single HTTP write request can include values to be written to multiple characteristics (e.g., using JSON objects or other notational conventions that support structured data objects), and it is to be understood that a single timed write procedure can be used to modify multiple characteristics whenever the transport supports modifying multiple characteristics with a single request. At block 1012, controller 202 can generate and encode a JSON payload. The JSON payload can include the write data, e.g., as a data structure identifying one or more characteristics to be written (the characteristic instance identifier can be used) and a value to be written to each, along with a TTL parameter. Encoding the JSON payload can include encrypting and/or digitally signing the JSON payload, e.g., using a session key of the pair-verified session. At block 1014, controller 202 can start a timer for the prepare phase; as described above, this timer can be used to enforce a requirement that accessory 204 responds to the cache data instruction within a timeout period (e.g., 2 seconds, 5 seconds, 10 seconds). At block 1016, controller 202 can send an HTTP POST request to a URL of accessory 204 that has been designated to receive cache data instructions in connection with a timed write procedure. (This URL can be, for example, a relative URL named/cacheWriteData; other names can be substituted.) The HTTP POST request can include the encoded JSON payload.

At block 1018, accessory 204 can receive the HTTP POST request. Based on the URL to which the request is directed, accessory 204 can determine that the request includes write data for a timed write procedure. At block 1020, accessory 204 can extract and verify the JSON payload, which can include, e.g., verifying the digital signature. (If verification fails, accessory 204 can quit with an error response). At block 1022, accessory 204 can cache the write data extracted from the JSON payload. At block 1024, accessory 204 can send an HTTP response to controller 202; assuming no error has occurred, the response can include a status code indicate successful execution of the POST request. In some embodiments, the response can be digitally signed by accessory 204 (e.g., using a session key of the pair-verified session).

At block 1026, controller 202 can receive the response from accessory 204. If the response is digitally signed, controller 202 can use the signature to verify that the response originated from accessory 204. At block 1028, controller 202 can determine, based on the timer started at block 1014, whether the response was received within the timeout period. If not, then controller 202 can quit the timed write process at block 1030 without sending the execute write instruction. If the response was timely, the timed write process can continue at block 1032.

Upon completion of process 1000, accessory 204 has received and cached write data and has confirmed receipt of the write data but has not yet executed the write. As described above, controller 202 can send a separate execute write instruction to instruct accessory 204 to execute the write.

Figure 11:
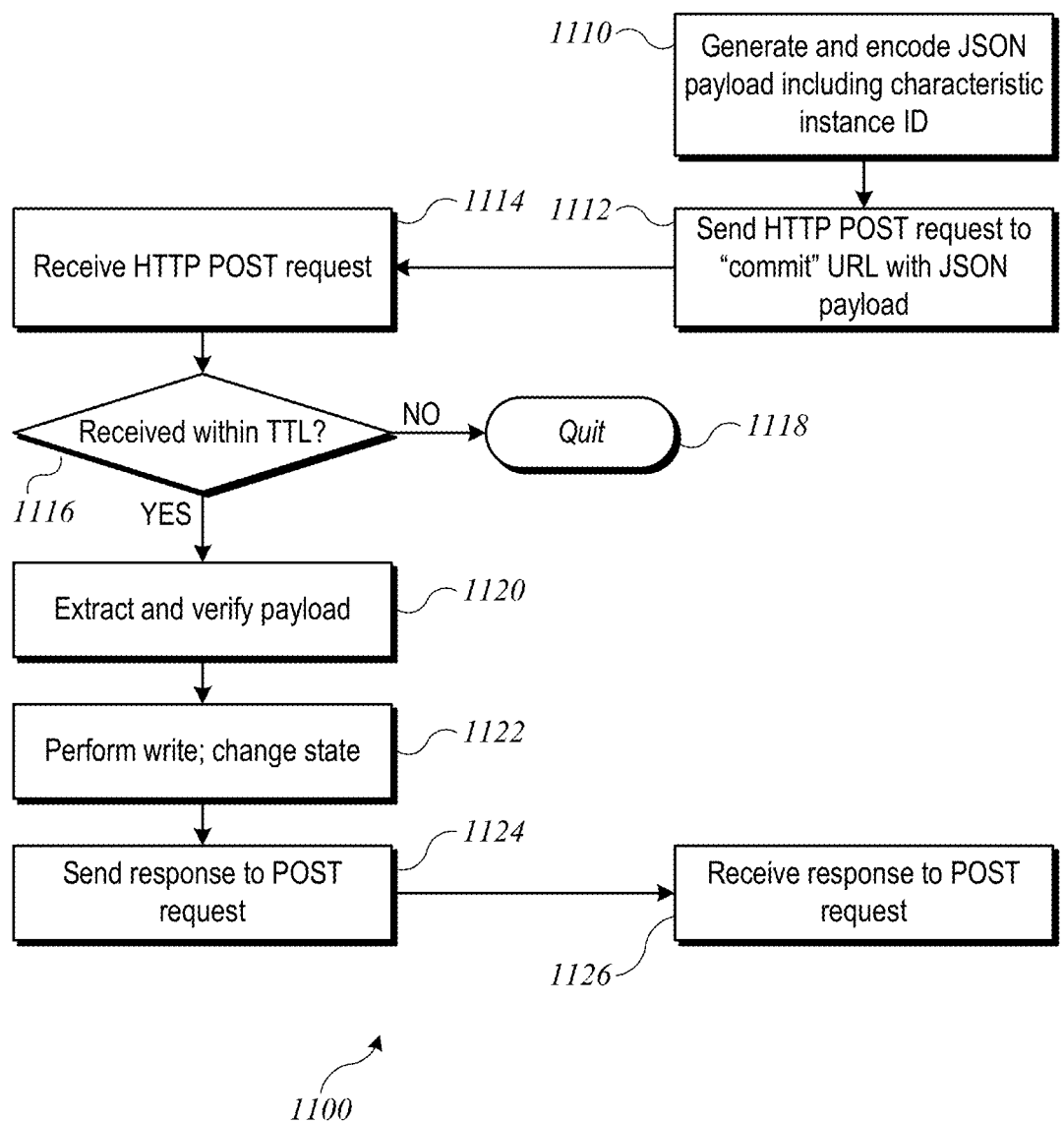
FIG. 11 shows a flow diagram of a process implementing an execute write instruction for a timed write procedure according to an embodiment of the present invention.

FIG. 11 shows a flow diagram of a process 1100 implementing an execute write instruction for a timed write procedure according to an embodiment of the present invention. Portions of process 1100 can be performed by a controller (e.g., any of controllers 202 of FIG. 2), and other portions of process 1100 can be performed by an accessory (e.g., any of accessories 204 of FIG. 2). Process 1100 can be executed in response to completion of process 1000, while controller 202 and accessory 204 have a pair-verified session. Process 1100 can be understood as a specific example of implementation of blocks 724-738 of process 700 in an embodiment where HTTP/IP is the transport; however, process 900 can also be used with other transports.

Process 1100 can begin when controller 202 has confirmed that accessory 204 received and processed a cache data instruction (e.g., using process 1000). At block 1110, controller 202 can generate and encode a JSON payload that can include a characteristic instance identifier matching the instance identifier of the characteristic being written. If multiple characteristics are to be written, instance identifiers for all of the characteristics can be included. Encoding the JSON payload can include encrypting and/or digitally signing the JSON payload, e.g., using a session key of the pair-verified session. At block 1112, controller 202 can send an HTTP POST request to a URL of accessory 204 that has been designated to receive execute write instructions in connection with a timed write. (This URL can be, for example, a relative URL named /executeWriteData; other names can be substituted.) The HTTP POST request can include the encoded JSON payload.

At block 1114, accessory 204 can receive the HTTP POST request. Based on the URL to which the request is directed, accessory 204 can determine that the request signifies an execute write instruction for a timed write procedure. At block 1116, accessory 204 can determine whether the execute write instruction was received prior to expiration of the TTL timer that was started in response to the previous cache data instruction (e.g., at block 1024 of process 1000). This determination can be similar to block 728 of process 700 described above. If the execute write instruction is not received within the time to live, process 1100 can end with an error at block 1118. In some embodiments, accessory 204 can send an error message to controller 202.

If, at block 1116, the execute write request is received prior to expiration of the TTL timer, then at block 1120, accessory 204 can extract and verify the JSON payload, which can include, e.g., verifying the digital signature. (If verification fails, accessory 204 can quit with an error response). At block 1122, accessory 204 can perform the write and execute any associated state changes. This can be similar to blocks 732 and 734 of process 700 described above. At block 1124, accessory 204 can send an HTTP response to controller 202; assuming no error has occurred, the response can include a status code indicate successful execution of the POST request. In some embodiments, the response can be digitally signed by accessory 204 (e.g., using a session key of the pair-verified session). At block 1126, controller 202 can receive the response from accessory 204. If the response is digitally signed, controller 202 can use the signature to verify that the response originated from accessory 204. If any problem is detected, controller 202 can notify the user and/or take other protective measures as desired.

It is to be understood that the various secure read and write procedures described above are illustrative and that variations and modifications are possible. For example, the particular content of payloads can be varied. Timeout periods associated with various instructions or responses can also be modified. In some embodiments, a time to live parameter for a timed write procedure can be established by the accessory rather than the controller. Shorter time to live can reduce the risk of an interloper intentionally introducing delay; however, it can also increase the likelihood of a legitimate request being rejected as not being received within the time to live.) Timeout periods can be imposed on any set of requests and/or responses. If a timeout or any other error occurs (e.g., failure to decrypt a payload or validate a signature, invalid opcode tokens, a payload containing a characteristic instance ID that does not correspond to the target characteristic UUID of the GATT write request that included the payload), the controller or accessory can detect the error and take corrective action. For example, in response to an error, the controller or accessory can retry the request, notify the other device, terminate the pair-verified session, and/or generate an alert to the user. In some embodiments, the corrective action may depend on the particular type of error.

Further, in the above examples of secure read and write procedures using Bluetooth LE, it is assumed that a single GATT request or response can include the entire UAP payload being sent. However, it is possible that some UAP payloads may be larger than the maximum payload size of a GATT request or response. Where this is the case, the UAP payload can be fragmented and delivered using multiple GATT requests or responses, and each fragment of the UAP payload can be independently encrypted. Each fragment can also include fragmentation information that allows the recipient device to reassemble the entire UAP payload after independently decrypting each fragment.

Secure read and write procedures as described above can be used in any combination and with any transport. As compared to conventional read or write processes, the secure read and write procedures can provide various security enhancements. For example, the controller can send encrypted and/or signed payloads to the accessory, allowing the accessory to verify that the request originated from an authorized controller. In addition, in the case of Bluetooth LE as a transport, where the encrypted UAP payload includes an identifier of the target characteristic (e.g., its instance ID), attacks predicated on redirecting a GATT request to a different characteristic can be thwarted because the accessory can detect the mismatch between the target characteristic identified in the GATT request and the target characteristic identified in the encrypted UAP payload. Further, as described above, the accessory can send an encrypted and/or signed response to each request, allowing the controller to verify that the request was received and processed by the intended accessory (and to detect instances where this did not occur). In instances where timeout periods are used, the controller and accessory may be able to detect and prevent attacks predicated on intercepting and delaying legitimate communications.

Secure Tunneled Communication

As described above with reference to FIG. 2, a controller (e.g., controller 202(3)) may be able to communicate with an accessory (e.g., accessory 204(3)) via tunnel 212, which can translate uniform accessory protocol commands between a first transport (e.g., HTTP messages sent using Wi-Fi or other IP-based transport) used between controller 202(3) and tunnel 212 and a second transport (e.g., Bluetooth LE transport) used between tunnel 212 and accessory 204(3).

To facilitate tunneled communication, tunnel 212 can establish a Bluetooth pairing and optionally a UAP pairing with accessory 204(3). Through these pairings, tunnel 212 can obtain the accessory attribute database for accessory 204(3), e.g., using a signature read procedure similar to processes 400 and 500 described above. (If a UAP pairing is not established, tunnel 212 can use an unsecured signature read procedure.) Tunnel 212 can generate an IP-compliant representation of the attribute database and provide this representation to controller 202(3). In some embodiments, controller 202(3) can use the representation of the attribute database provided by tunnel 210.

However, it may not be desirable for controller 202(3) to trust that tunnel 212 is presenting an accurate representation of the attribute database. Accordingly, controller 202(3) can perform a (secured) signature read procedure with accessory 204(3) via tunnel 212 to obtain attribute database information directly from accessory 204(3). If the information exchanged during the signature read procedure is encrypted using keys known only to the endpoints (i.e., controller 202(3) and accessory 204(3)), tunnel 212 can be rendered unable to alter the information. In some embodiments, controller 202(3) can compare the attribute database information obtained from accessory 204(3) via the signature read procedure with the representation of the attribute database presented by tunnel 212; if there is a discrepancy, controller 202(3) can infer that tunnel 212 is not to be trusted. In some embodiments, controller 202(3) can determine not to communicate via an untrusted tunnel and can notify the user that a problem exists. In other embodiments, communication using secure read and write procedures (e.g., as described above) can be conducted via an untrusted tunnel, relying on the inherent security of the encrypted and signed payloads.

Figure 12A:
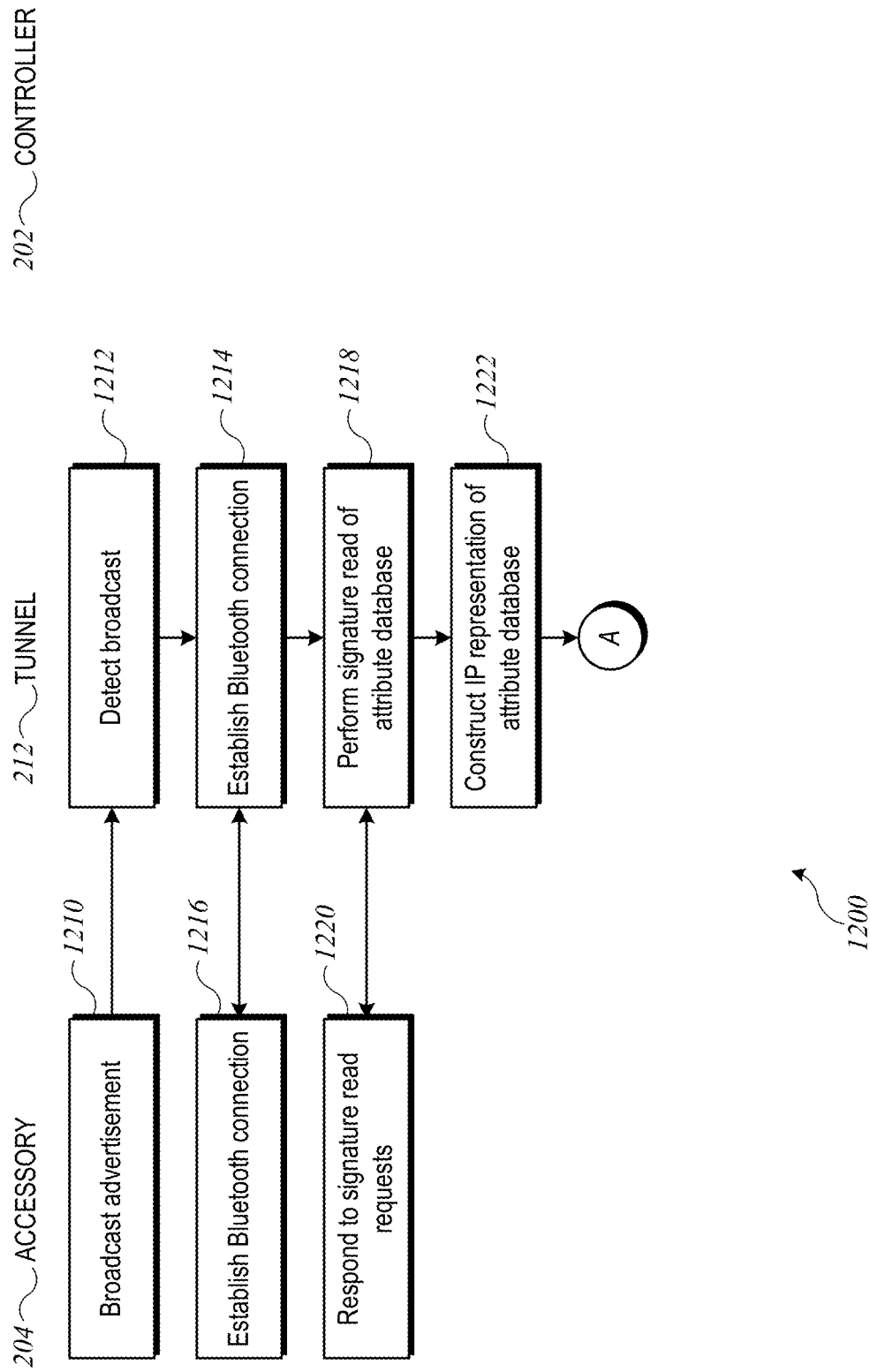
FIGS. 12A and 12B show a flow diagram of a process for establishing communication between a controller and an accessory via a tunnel according to an embodiment of the present invention.
Figure 12B:
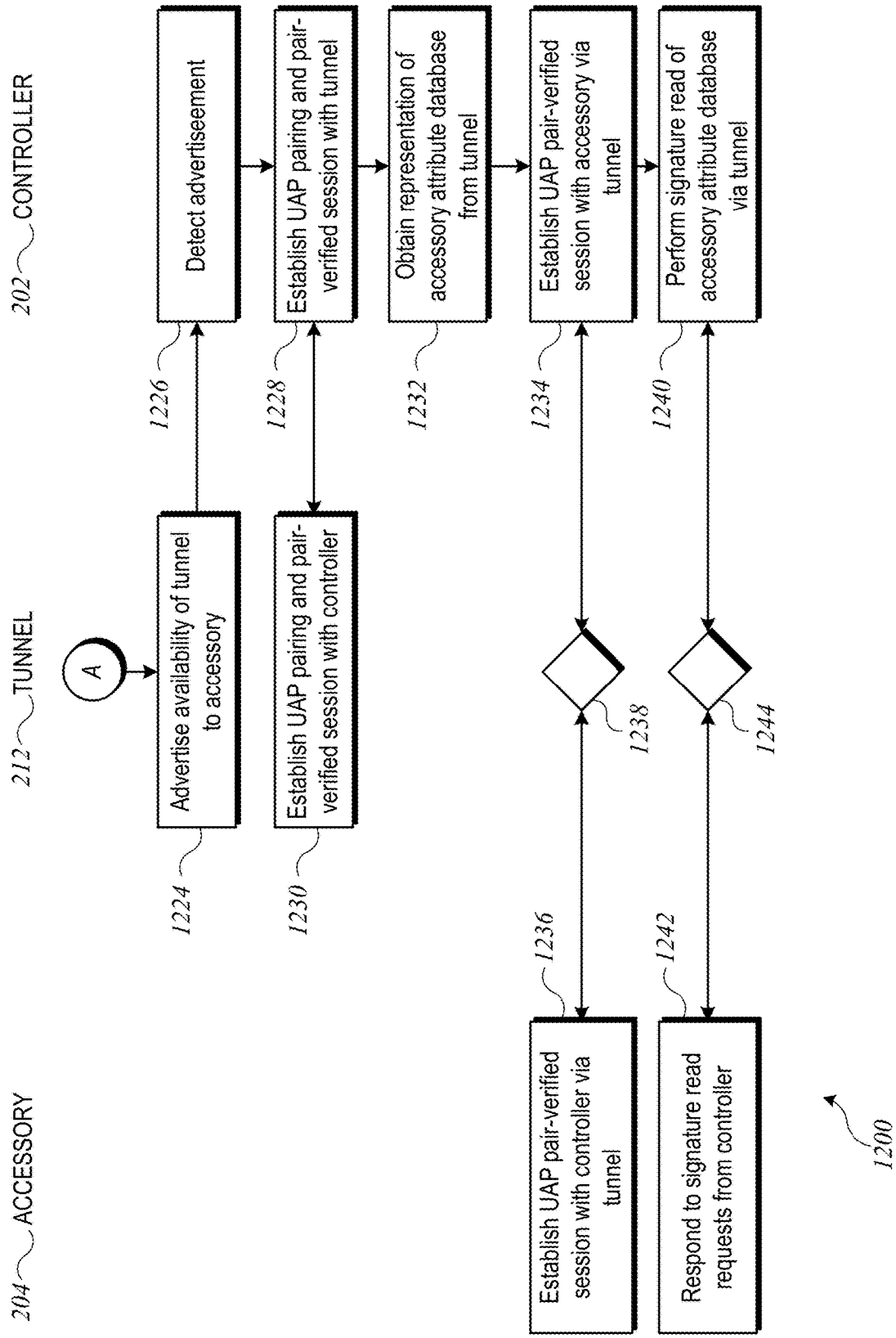

FIGS. 12A and 12B show a flow diagram of a process 1200 for establishing communication between a controller and an accessory via a tunnel according to an embodiment of the present invention. Portions of process 1200 can be performed by a controller (e.g., controller 202(3) or any other controller 202 of FIG. 2), other portions can be performed by an accessory (e.g., accessory 204(3) or any other accessory 204 of FIG. 2), and still other portions can be performed by a tunnel (e.g., tunnel 212 of FIG. 2). In some embodiments, Bluetooth LE can be used as a transport between accessory 204 and tunnel 212 while an IP-based transport (e.g., Wi-Fi transport) can be used between tunnel 212 and controller 202.

For purposes of description, it is assumed that tunnel 212 and accessory 204 have not previously communicated. Referring first to FIG. 12A, at block 1210, accessory 204 can broadcast an advertisement. In some embodiments, the advertisement can conform to a Bluetooth LE protocol and can include information about accessory 204, e.g., an identifier of one of the services included in a GATT database for accessory 204. At block 1212, tunnel 212 can detect the advertisement and determine that a connection to the accessory should be established. In some embodiments, controller 202 can participate in the initial determination to establish a connection between tunnel 212 and accessory 204.

At blocks 1214 and 1216, tunnel 212 and accessory 204 can establish a Bluetooth connection. This can be similar to blocks 414-426 of process 400 described above; for example, blocks 214 and 216 can include tunnel 212 requesting and obtaining the GATT database from accessory 204. As described above, the GATT database provided by accessory 204 can include selected information such as the instance IDs and UUIDs of various services and characteristics, as well as selected descriptors (including, e.g., the UAP properties descriptor) and can exclude certain other information (e.g., sensitive descriptor such as type identifiers and/or values of some or all of the characteristics). In some embodiments, controller 202 can participate in the determination to establish the Bluetooth connection.

At blocks 1218 and 1220, tunnel 212 can perform a signature read procedure with accessory 204 to securely obtain the rest of the attribute database information from accessory 204. The signature read procedure can be similar or identical to procedures described above with reference to FIGS. 4 and 5. In some embodiments, the signature read procedure can be an unsecured signature read procedure as described above, and it is not necessary for tunnel 212 to establish a UAP pairing with accessory 204.

In other embodiments, tunnel 212 can establish a UAP pairing and UAP pair-verified session with accessory 204, and a secured signature read procedure (i.e., a signature read procedure using session keys of a pair-verified session to encrypt and sign payloads) can be performed. For example, as noted above, establishing the Bluetooth connection at blocks 1214 and 1216 can include tunnel 212 reading selected information from the GATT database of accessory 204. A decision to establish the UAP pairing can be based at least in part on the selected information provided by the accessory. In some embodiments, controller 202 can participate in the determination to establish either or both of the Bluetooth connection and the UAP pairing.

At block 1222, tunnel 212 can construct a representation of the attribute database suitable for communicating with controller 202. For instance, if communication with controller 202 uses an IP-based transport, the attribute database can be represented as a structured data object using JSON (Java Script Object Notation) or the like. The representation constructed at block 1222 can include information initially provided in the GATT database as well as additional information obtained using the signature read procedure.

Referring now to FIG. 12B, at block 1224, tunnel 212 can advertise (e.g., via a broadcast on the IP-based transport) its availability as a tunnel to accessory 204. The advertisement can include selected information from the accessory attribute database.

At block 1226, controller 202 can detect the advertisement and determine that controller 202 should use tunnel 212 to communicate with accessory 204. At blocks 1228 and 1230, controller 202 can establish a UAP pair-verified session with tunnel 212, e.g., using pair setup and pair verify processes as described above. (In some embodiments, controller 202 and tunnel 212 may have already establish a UAP pairing prior to execution of process 1200, in which case a new pair-verified session can be established). Once the UAP pairing is established, at block 1232, controller 202 can obtain a representation of the accessory attribute database from tunnel 212. This can be the representation constructed by tunnel 212 at block 1222. The representation can be provided within a pair verified session between controller 202 and tunnel 212, providing security for the data.

Thereafter, controller 202 can access a "tunnel" service of tunnel 212 that can be used to provide messages that the tunnel should relay to accessory 204. In some embodiments, these messages can include encrypted payloads that tunnel 212 can incorporate (without decrypting them) into messages to accessory 204. In a similar manner, accessory 204 can access the tunnel service of tunnel 212 to provide messages that the tunnel should relay to controller 202. Examples of a tunnel service and message exchange via a tunnel are described in above-referenced U.S. application Ser. No. 14/725,891.

Using the tunnel service, at blocks 1234 and 1236, controller 202 and accessory 204 can establish a UAP pair-verified session. (The tunneling operation is indicated in FIG. 12B by diamond 1238.) In this example, it is assumed that controller 202 and accessory 204 have previously established a UAP pairing through a direct Bluetooth LE connection; in some embodiments, blocks 1234 and 1236 can include establishing a UAP pairing via tunnel 212.

At blocks 1240 and 1242, controller 202 can perform a signature read procedure with accessory 204 via tunnel 212 to securely obtain the rest of the attribute database information from accessory 204. (The tunneling operation is indicated in FIG. 12B by diamond 1244.) The signature read procedure can be similar or identical to procedures described above with reference to FIGS. 4 and 5. The signature read procedure can be a secure signature read procedure (performed within a UAP pair verified session between controller 202 and accessory 204), and the payloads can be encrypted using session keys that are known to controller 202 and accessory 204 but not known to tunnel 212. Accordingly, controller 202 can verify that the data obtained during the signature read procedure at blocks 1240 and 1242 was provided by accessory 204 and was not modified by tunnel 212. This can help to ensure that controller 202 has an accurate representation of the attribute database of accessory 204, reducing the need to trust tunnel 212.

In some embodiments, controller 202 can compare the accessory attribute database information obtained from accessory 204 via the signature read process (block 1240) with the representation obtained from tunnel 212 (block 1232). If a discrepancy is detected controller 202 may determine that tunnel 212 is not trusted and cease communicating with accessory 204 via tunnel 212; in this case, controller 202 may prompt the user to check the status of tunnel 212. In addition or instead, controller 202 can also block all further communication with accessory 204 (including direct communication) and/or prompt the user to check the status of accessory 204. After the user confirms the status, communication can be restored.

Alternatively, even if tunnel 212 is not trusted, controller 202 can use the secure read and write procedures described above to communicate with accessory 204, relying on the attribute database information obtained at block 1240 and ignoring any contrary information provided by tunnel 212. As described above, the secure read and write procedures can allow controller 202 and/or accessory 204 to detect attempted interference with communication between them; accordingly, controller 202 and/or accessory 204 can detect whether tunnel 212 is attempting to interfere, e.g., by redirecting requests to a different target characteristic and/or delaying delivery of requests and/or responses.

Additional Optimizations

Secure read and write procedures as described herein can help to reduce the likelihood of success of various attacks, such as a man in the middle redirecting a write or read to a characteristic other than the controller's intended target or intercepting and delaying write requests. However, enhanced security may come at the cost of additional transactions and/or additional computations. In some embodiments, additional optimizations can be used to reduce these costs without forfeiting security.

For instance, in some embodiments, it is not necessary for a controller (or tunnel) to perform a signature read procedure each time it connects to an accessory. A controller (or tunnel) can cache the information obtained during a signature read procedure and use the cached information during subsequent connections, rather than performing the signature read procedure again during each connection. In some embodiments, an accessory can use its Bluetooth LE advertisement to indicate when a status change has occurred, and a controller that is reconnecting to the accessory can determine whether to perform a signature read procedure based on the advertisement. In some embodiments, a signature read procedure can be selectively required for some but not all characteristics; information about other characteristics can be provided using only the security features of Bluetooth LE (or other transport). In some embodiments, an accessory manufacturer can determine which characteristics to protect by requiring signature read; the choice may depend on the nature of the particular accessory or characteristic. For instance, a door lock may benefit more from enhanced security than a light bulb.

As described above, secure read and write operations may have as a precondition that the controller and accessory have established a pair-verified session that provides one or more session keys usable to encrypt and sign message payloads. Establishing a pair-verified session may involve the accessory and the controller each generating a temporary key pair using an elliptic curve computation or the like. Such computations can be time-consuming and resource-intensive, particularly in the case where the device in question is designed for low-power consumption (as may be the case for certain accessories). Accordingly, in order to reduce the need for such computations, some embodiments can support a UAP "pair resume" process in addition to a pair verify process. In a pair resume process, a controller and accessory that have previously established a pair-verified session (e.g., using pair verify or a previous iteration of pair resume) can store session information from that session after the session ends. The session can be resumed by generating new session keys using the stored session information.

Figure 13A:
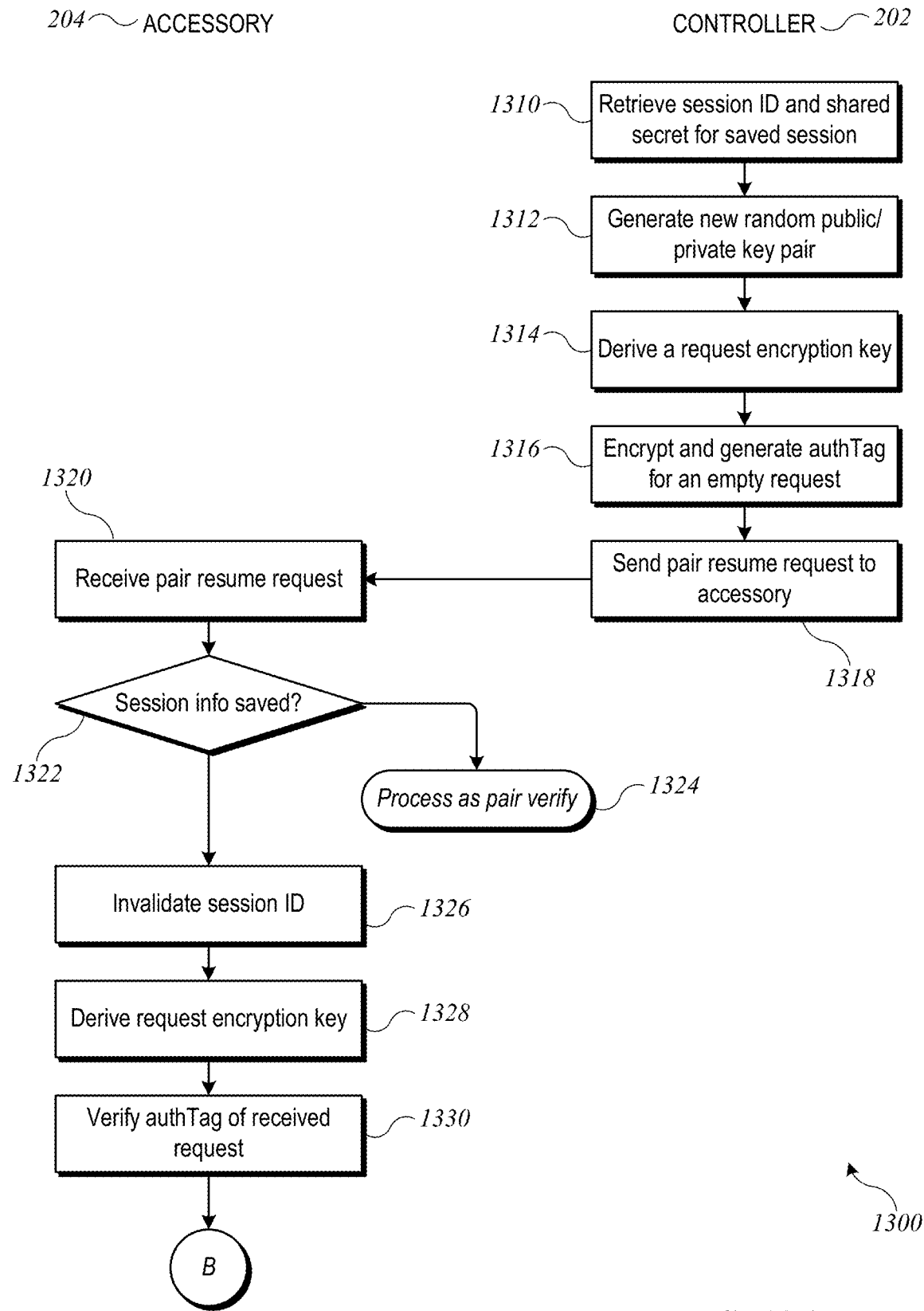
FIGS. 13A and 13B show a flow diagram of a pair resume process according to an embodiment of the present invention.
Figure 13B:
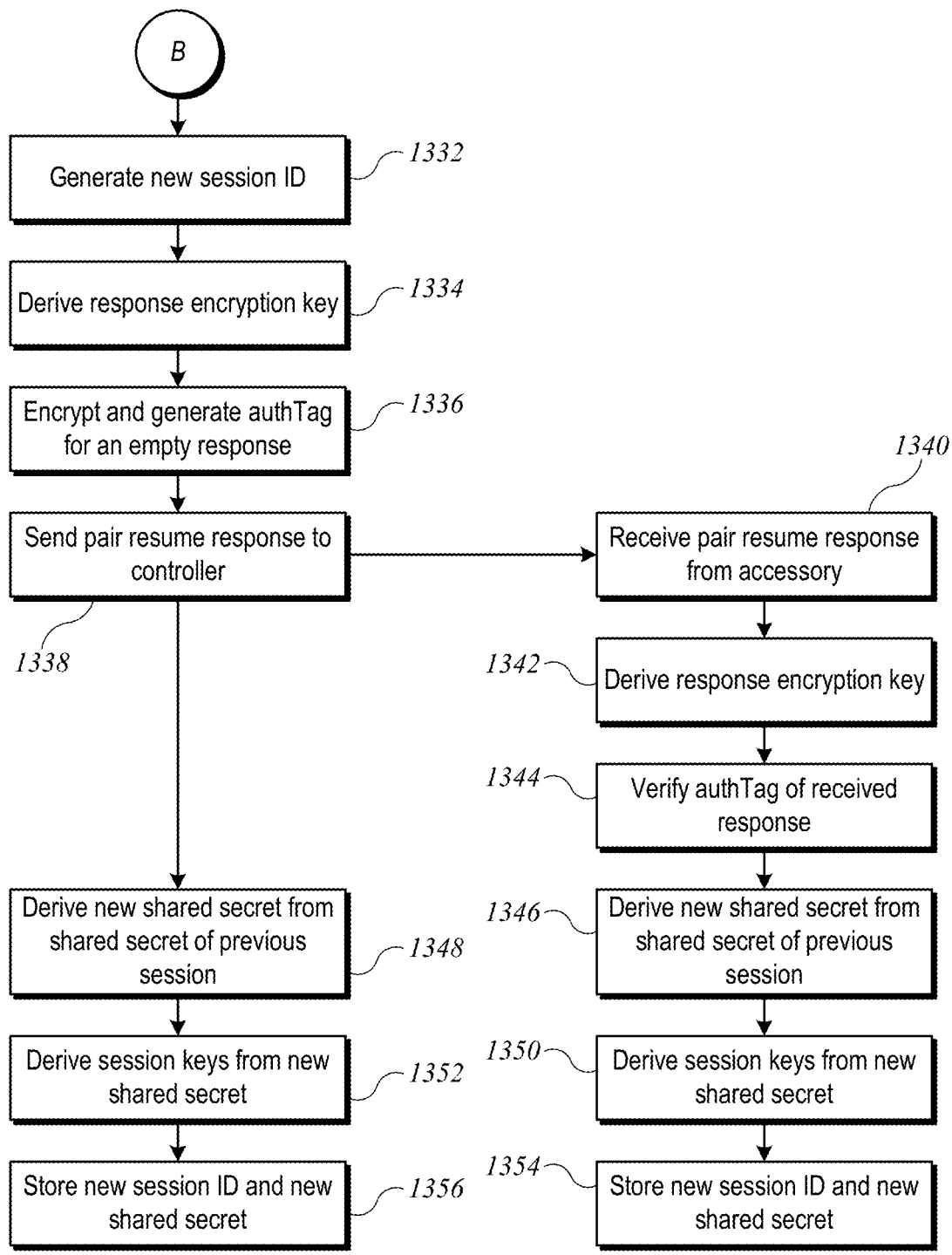

FIGS. 13A and 13B show a flow diagram of a pair resume process 1300 according to an embodiment of the present invention. Portions of process 1300 can be performed by a controller (e.g., any of controllers 202 of FIG. 2), and other portions of process 1300 can be performed by an accessory (e.g., any of accessories 204 of FIG. 2). In some embodiments, the controller and accessory can use Bluetooth LE as a transport; in other embodiments, HTTP/IP or other transports can be substituted. It is assumed that the controller and the accessory have previously established a UAP pairing and a UAP pair-verified session, e.g., using processes described in above-referenced application Ser. No. 14/614,914.

Process 1300 can begin at a time when a pair-verified session is not in progress between controller 202 and accessory 204. For instance, in some embodiments where controller 202 and accessory 204 communicate using Bluetooth LE as a transport, any loss or termination of the Bluetooth LE connection can result in ending the pair-verified session. In some embodiments, controller 202 and accessory 204 can each save a session identifier ("session ID") assigned to the pair-verified session and the shared secret that was used to establish session keys for the pair-verified session. The session information can be saved even after the pair-verified session ends. Using process 1300, the saved session information can be used to establish a new pair-verified session.

Referring first to FIG. 13A, process 1300 can begin when controller 202 determines to establish a new pair-verified session with accessory 204. This can occur, e.g., in response to user input or any other event that results in controller 202 determining that it needs to communicate with accessory 204 at a time when a pair-verified session is not in progress.

At block 1310, controller 202 can retrieve session information, including a stored session ID and a session-specific shared secret, from a previous pair-verified session with accessory 204. (Storing of session IDs is described below.) If there is not a stored session ID and shared secret, controller 202 can exit process 1300 and initiate a pair-verify process instead. The pair-verify process can include generating a new shared secret and session ID that can be stored and used in a future instance of executing process 1300.

Assuming that controller 202 is able to retrieve a stored session ID and shared secret, at block 1312, controller 202 can generate a new random public/private key pair, e.g., using Curve22519 or other elliptic curve algorithms. At block 1314, controller 202 can derive a request encryption key. For instance, a secure hash function such as HKDF-SHA-512 can be used. The inputs can include the stored shared secret and session ID retrieved at block 1310, the new public key generated at block 1312, and an additional string known to the controller and the accessory. At block 1316, controller 202 can encrypt and sign an empty request message using the request encryption key derived at block 1314. Standard encryption algorithms such as ChaCha20-Poly1305 can be used, and the encryption algorithm can also generate an authentication tag ("authTag") for the request. At block 1318, controller 202 can send a pair resume request to accessory 204 (e.g., using a GATT write request to an appropriate characteristic of a pairing service of accessory 204 or an HTTP POST request directed to an appropriate pairing-service URL defined at accessory 204). The pair resume request can include a method identifier identifying the request as a pair resume request, the new public key generated at block 1312, the session ID retrieved at block 1310, and the authTag generated at block 1316.

At block 1320, accessory 204 can receive the pair resume request. At block 1322, accessory 204 can determine whether it has saved session information corresponding to the session ID included in the pair resume request. If not, then at block 1324, accessory 204 can exit process 1300 and continue processing the request as the first request of a pair-verify process (e.g., as described in above-referenced application Ser. No. 14/614,914). For purposes of the pair verify process, the public/private key pair generated by controller 202 can be used as its short-term public key. In cases where the accessory does not have saved session data corresponding to the received session ID, this fallback mechanism can avoid the overhead of additional communications in which the accessory would indicate failure of pair resume and the controller would then initiate a pair verify process instead.

If, at block 1322, accessory 204 has saved session information, then at block 1326 accessory 204 can invalidate the saved session ID, thereby preventing the same pair-verified session from being used repeatedly to initiate new sessions using pair resume. At block 1328, accessory 204 can derive a request encryption key, e.g., using the same algorithm and inputs used by controller 202 at block 1314. Accessory 204 can obtain the shared secret from its own store of saved session information.

At block 1330, accessory 204 can use its request encryption key to verify the authTag of the received request. Since the saved shared secret from the previous pair-verified session is one of the inputs used to generate the encryption key, this allows accessory 204 to verify that controller 202 is in possession of the shared secret from the previous pair-verified session. Although not explicitly shown, it is to be understood that if the authTag is not verified, accessory 204 can send an error message to controller 202, and process 1300 can end.

Referring now to FIG. 13B, at block 1332, accessory 204 can generate a new session ID for the new pair-verified session. The new session ID can be generated using a random number generation algorithm (including pseudorandom number generators) or other algorithm that has the property that the new session ID is not readily guessable from the previous session ID. At block 1334, accessory 204 can generate a response encryption key. For instance, a secure hash function such as HKDF-SHA-512 can be used. The inputs can include the shared secret from the previous session, the new session ID generated at block 1332, the controller's public key, and an additional string known to the controller and accessory (which can be different from the string used at block 1314). It should be noted that accessory 204 does not need to generate its own public/private key pair, which allows accessory 204 to avoid the overhead of elliptic curve computations. At block 1336, accessory 204 can encrypt and sign an empty response message using the response encryption key derived at block 1334. Standard encryption algorithms such as ChaCha20-Poly1305 can be used, and the encryption algorithm can also generate an authentication tag ("authTag") for the response. At block 1338, accessory 204 can send a pair resume response to controller 202. (For instance, the accessory can send a GATT write response to indicate that its pair resume response is ready to send, and the controller can retrieve the pair resume response by sending a GATT read request to an appropriate characteristic of a pairing service of accessory 204. For HTTP/IP, the accessory can send a response to the POST request received from the controller to indicate that its pair resume response is ready to send, and the controller can send a GET request to an appropriate URL defined at the accessory to retrieve the pair resume response.) The pair resume response can include a method identifier identifying the request as a pair resume response, the new session ID generated at block 1332, and the authTag generated at block 1336.

At block 1340, controller 202 can receive the pair resume response from accessory 204. At block 1342, controller 202 can derive a response encryption key, e.g., using the same algorithm and inputs used by accessory 204 at block 1334. At block 1344, controller can use its response encryption key to verify the authTag of the received response. Since the saved shared secret from the previous pair-verified session is one of the inputs used to generate the encryption key, this allows controller 202 to verify that accessory 204 is in possession of the shared secret from the previous pair-verified session.

At blocks 1346 and 1348, controller 202 and accessory 204 can each generate a new shared secret using the shared secret from the previous session. For instance, a secure hash function such as HKDF-SHA-512 can be used. The inputs can include the shared secret from the previous session, the public key generated by controller 202 at block 1312, the new session ID generated by accessory 204 at block 1332, and an additional string known to both controller 202 and accessory 204 (which can be different from the strings used at blocks 1314 and 1334). At blocks 1350 and 1352, controller 202 and accessory 204 can each generate one or more session keys for a new pair-verified session using the new shared secret. The same algorithms and inputs used in a pair-verify process can be applied. For example, two session keys can be generated, one for messages sent from the controller to the accessory and one for messages sent from the accessory to the controller. At this point, a new pair-verified session is established, and controller 202 and 204 can begin to communicate within the session, e.g., exchanging message payloads encrypted and signed with session keys derived at blocks 1350 and 1352.

At blocks 1354 and 1356, controller 202 and accessory 204 can each store session information including the new session ID (generated by accessory 204 at block 1332) and new shared secret (generated by controller 202 at block 1346 and separately generated by accessory 204 at block 1348). In some embodiments, this session information can be stored in a secure storage element. In this manner, stored session information can be made available for a future iteration of process 1300.

It is to be understood that process 1300 is illustrative, and that variations and modifications are possible. The particular algorithms, inputs, and message contents can be varied as desired. Using process 1300, an accessory and a controller that have established one pair-verified session can use that session to "bootstrap" a next pair-verified session (based on proof that each device is in possession of the shared secret from the previous pair-verified session) without the accessory having to generate a new cryptographic key pair. This can reduce the computational burden on the accessory and speed up the establishment of the new pair-verified session. In addition, in some embodiments pair verify may require multiple requests and responses to be exchanged between the controller and the accessory (e.g., two request-response exchanges in one process described in above-referenced application Ser. No. 14/614,914), while pair resume can be accomplished using one request-response exchange. This can reduce bandwidth requirements, power consumption, and delay related to the propagation time of messages.

The accessory and the controller can each independently determine whether to permit pair resume. For example, either device can apply a timeout period to its stored session information. If the pair-verified session to which the stored session information pertains is ended and pair resume is not subsequently initiated within the timeout period, the stored session information can be invalidated (e.g., by deleting it or marking it invalid without actually deleting it), thereby preventing the success of a future pair resume operation. Each device can select its own timeout period.

In some embodiments, an accessory or controller can invalidate stored session information in response to various events. For instance, rebooting or power-cycling a device may result in the device invalidating its stored session information. In some embodiments, a device may limit the number of sessions for which it stores session information. For instance, an accessory may save session information for just the most recent pair-verified session; the same controller can use pair resume to create a new pair-verified session, but a different controller would need to use pair verify. Alternatively, an accessory can save the most recent session information for each of a number of different controllers. It should be noted that where the prior session information is invalidated during pair resume, the accessory does not need to store information for more than one session per controller. Similar considerations apply to a controller, which can maintain per-accessory session information or just the information for the most recent session regardless of accessory.

In some embodiments, a controller or accessory may limit the number of times a counterpart device (accessory or controller) can use pair resume. For instance, the stored session information stored by a controller or accessory can include a counter that is incremented each time a pair resume occurs; when the counter reaches a maximum value, the controller or accessory can invalidate the session information, and pair verify will be required to establish any further sessions.

Policies regarding the storing and invalidating of session information (including whether to allow pair resume at all) can be established on a per-device basis, taking into account the costs and benefits of different choices.

Example Devices

Embodiments described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator or tunnel as described above.

Figure 14:
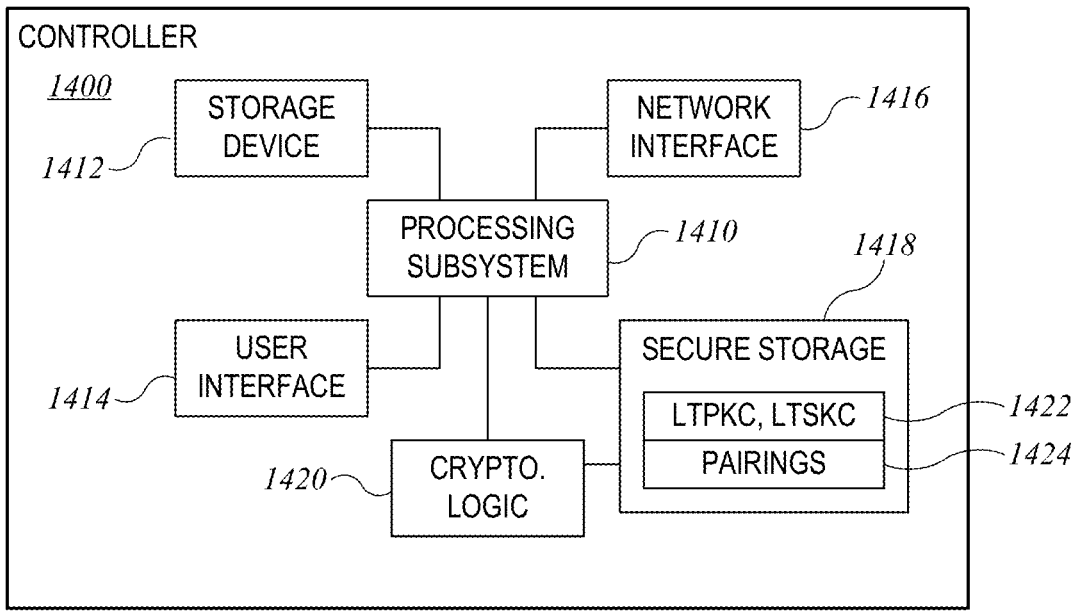
FIG. 14 shows a simplified block diagram of a controller according to an embodiment of the present invention.

FIG. 14 shows a simplified block diagram of a controller 1400 according to an embodiment of the present invention. Controller 1400 can implement any or all of the controller functions, behaviors, and capabilities described herein, as well as other functions, behaviors, and capabilities not expressly described. Controller 1400 can include processing subsystem 1410, storage device 1412, user interface 1414, communication interface 1416, secure storage module 1418, and cryptographic logic module 1420. Controller 1400 can also include other components (not explicitly shown) such as a battery, power controllers, and other components operable to provide various enhanced capabilities. In various embodiments, controller 1400 can be implemented in a desktop computer, laptop computer, tablet computer, smart phone, other mobile phone, wearable computing device, or other systems having any desired form factor. Further, as noted above, controller 1400 can be implemented partly in a base station and partly in a mobile unit that communicates with the base station and provides a user interface.

Storage device 1412 can be implemented, e.g., using disk, flash memory, or any other non-transitory storage medium, or a combination of media, and can include volatile and/or non-volatile media. In some embodiments, storage device 1412 can store one or more application and/or operating system programs to be executed by processing subsystem 1410, including programs to implement various operations described above as being performed by a controller. For example, storage device 1412 can store a uniform controller application that can read an accessory description record and generate a graphical user interface for controlling the accessory based on information therein (e.g., as described in above-referenced U.S. application Ser. No. 14/614,914). In some embodiments, portions (or all) of the controller functionality described herein can be implemented in operating system programs rather than applications. In some embodiments, storage device 1412 can also store apps designed for specific accessories or specific categories of accessories (e.g., an IP camera app to manage an IP camera accessory or a security app to interact with door lock accessories). Storage device 1412 can also store other data produced or used by controller 1400 in the course of its operations, including representations of an accessory attribute database for one or more accessories.

User interface 1414 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1414 to invoke the functionality of controller 1400 and can view and/or hear output from controller 1400 via output devices of user interface 1414.

Processing subsystem 1410 can be implemented as one or more integrated circuits, e.g., one or more single-core or multi-core microprocessors or microcontrollers, examples of which are known in the art. In operation, processing system 1410 can control the operation of controller 1400. In various embodiments, processing subsystem 1410 can execute a variety of programs in response to program code and can maintain multiple concurrently executing programs or processes. At any given time, some or all of the program code to be executed can be resident in processing subsystem 1410 and/or in storage media such as storage device 1412.

Through suitable programming, processing subsystem 1410 can provide various functionality for controller 1400. For example, in some embodiments, processing subsystem 1410 can implement various processes (or portions thereof) described above as being implemented by a controller. Processing subsystem 1410 can also execute other programs to control other functions of controller 1400, including application programs that may be stored in storage device 1412. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 1416 can provide voice and/or data communication capability for controller 1400. In some embodiments communication interface 1416 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1416 can provide wired network connectivity (e.g., Ethernet) in addition to or instead of a wireless interface. Communication interface 1416 can be implemented using a combination of hardware (e.g., driver circuits, antennas, modulators/demodulators, encoders/decoders, and other analog and/or digital signal processing circuits) and software components. In some embodiments, communication interface 1416 can support multiple communication channels concurrently or at different times, using the same transport or different transports.

Secure storage module 1418 can be an integrated circuit or the like that can securely store cryptographic information for controller 1400. Examples of information that can be stored within secure storage module 1418 include the controller's long-term public and secret keys 1422 (LTPKC, LTSKC as described above), and a list of paired accessories 1424 (e.g., a lookup table that maps accessory ID to accessory long-term public key LTPKA for accessories that have completed a pair setup or pair add process as described above).

In some embodiments, cryptographic operations can be implemented in a cryptographic logic module 1420 that communicates with secure storage module 1418. Physically, cryptographic logic module 1420 can be implemented in the same integrated circuit with secure storage module 1418 or a different integrated circuit (e.g., a processor in processing subsystem 1410) as desired. Cryptographic logic module 1420 can include various logic circuits (fixed or programmable as desired) that implement or support cryptographic operations of controller 1400, including any or all cryptographic operations described above. Secure storage module 1418 and/or cryptographic logic module 1420 can appear as a "black box" to the rest of controller 1400. Thus, for instance, communication interface 1416 can receive a message in encrypted form that it cannot decrypt and can simply deliver the message to processing subsystem 1410. Processing subsystem 1410 may also be unable to decrypt the message, but it can recognize the message as encrypted and deliver it to cryptographic logic module 1420. Cryptographic logic module 1420 can decrypt the message (e.g., using information extracted from secure storage module 1418) and determine what information to return to processing subsystem 1410. As a result, certain information can be available only within secure storage module 1418 and cryptographic logic module 1420. If secure storage module 1418 and cryptographic logic module 1420 are implemented on a single integrated circuit that executes code only from an internal secure repository, this can make extraction of the information extremely difficult, which can provide a high degree of security. Other implementations are also possible.

Figure 15:
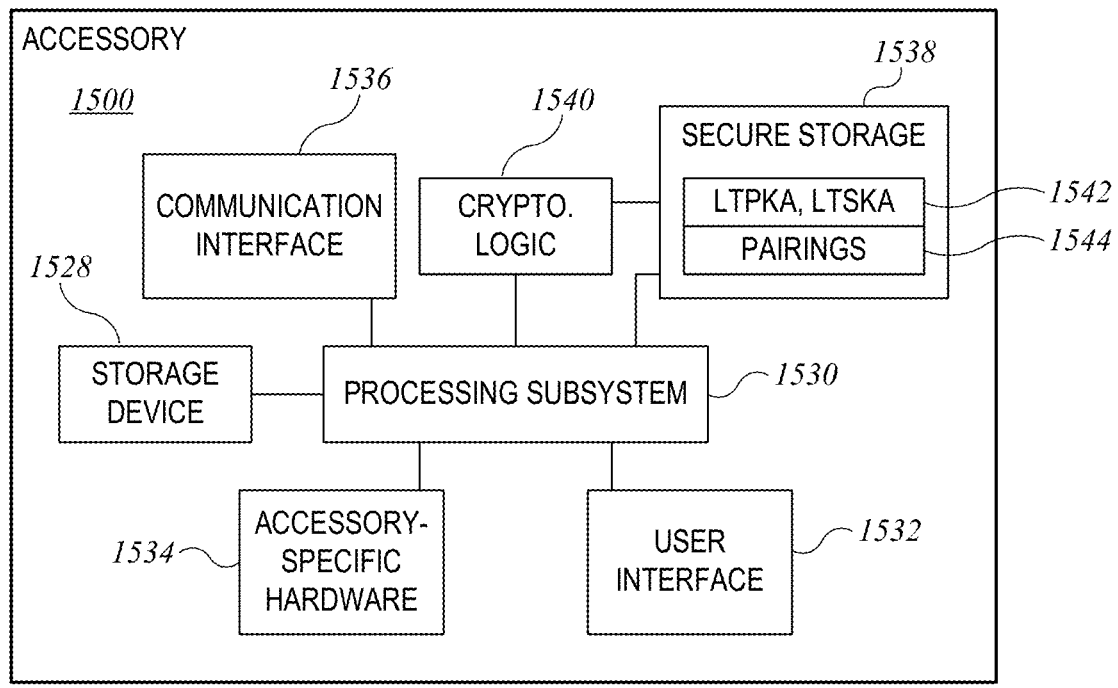
FIG. 15 shows a simplified block diagram of an accessory according to an embodiment of the present invention.

FIG. 15 shows a simplified block diagram of an accessory 1500 according to an embodiment of the present invention. Accessory 1500 can implement any or all of the accessory functions, behaviors, and capabilities described herein, as well as other functions, behaviors, and capabilities not expressly described. Accessory 1500 can include storage device 1528, processing subsystem 1530, user interface 1532, accessory-specific hardware 1534, communication interface 1536, secure storage module 1538, and cryptographic logic module 1540. Accessory 1500 can also include other components (not explicitly shown) such as a battery, power controllers, and other components operable to provide various enhanced capabilities.

Accessory 1500 is representative of a broad class of accessories that can be operated by a controller such as controller 1400, and such accessories can vary widely in capability, complexity, and form factor. Various accessories may include components not explicitly shown in FIG. 15, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1528 can be implemented, e.g., using disk, flash memory, or any other non-transitory storage medium, or a combination of media, and can include volatile and/or non-volatile media. In some embodiments, storage device 1528 can store one or more programs (e.g., firmware) to be executed by processing subsystem 1530, including programs to implement various operations described above as being performed by an accessory, as well as operations related to particular accessory behaviors. Storage device 1528 can also store an attribute database or accessory definition record that can be furnished to controller devices, e.g., as described above. Storage device 1528 can also store accessory state information and any other data that may be used during operation of accessory 1500.

Processing subsystem 1530 can include, e.g., one or more single-core or multi-core microprocessors and/or microcontrollers executing program code to perform various functions associated with accessory 1500. For example, processing subsystem 1530 can implement various processes (or portions thereof) described above as being implemented by an accessory, e.g., by executing program code stored in storage device 1528. Processing subsystem 1530 can also execute other programs to control other functions of accessory 1530. In some instances programs executed by processing subsystem 1530 can interact with a controller (e.g., controller 1400), e.g., by generating messages to be sent to the controller and/or receiving messages from the controller.

User interface 1532 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 1500, a user can operate input devices of user interface 1532 to invoke functionality of accessory 1500 and can view and/or hear output from accessory 1500 via output devices of user interface 1532. Some accessories may provide a minimal user interface or no user interface. at all. Where the accessory does not have a user interface, a user can still interact with the accessory using a controller (e.g., controller 1400).

Accessory-specific hardware 1534 can include any other components that may be present in accessory 1500 to enable its functionality. For example, in various embodiments accessory-specific hardware 1534 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 1534 and that accessory-specific hardware can include mechanical as well as electrical or electronic components.

Communication interface 1536 can provide voice and/or data communication capability for accessory 1500. In some embodiments communication interface 1536 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1536 can provide wired network connectivity (e.g., Ethernet) in addition to or instead of a wireless interface. Communication interface 1536 can be implemented using a combination of hardware (e.g., driver circuits, antennas, modulators/demodulators, encoders/decoders, and other analog and/or digital signal processing circuits) and software components. In some embodiments, communication interface 1536 can support multiple communication channels concurrently or at different times, using the same transport or different transports.

Secure storage module 1538 can be an integrated circuit or the like that can securely store cryptographic information for accessory 1500. Examples of information that can be stored within secure storage module 1538 include the accessory's long-term public and secret keys 1542 (LTPKA, LTSKA as described above), and a list of paired controllers 1544 (e.g., a lookup table that maps controller ID to controller long-term public key LTPKC for controllers that have completed a pair setup or pair add process as described above). In some embodiments, secure storage module 1538 can be omitted; keys and lists of paired controllers can be stored in storage device 1528.

In some embodiments, cryptographic operations can be implemented in a cryptographic logic module 1540 that communicates with secure storage module 1538. Physically, cryptographic logic module 1540 can be implemented in the same integrated circuit with secure storage module 1538 or a different integrated circuit (e.g., a processor in processing subsystem 1530) as desired. Cryptographic logic module 1540 can include various logic circuits (fixed or programmable as desired) that implement or support cryptographic operations of accessory 1500, including any or all cryptographic operations described above. Secure storage module 1538 and/or cryptographic logic module 1540 can appear as a "black box" to the rest of accessory 1500. Thus, for instance, communication interface 1536 can receive a message in encrypted form that it cannot decrypt and can simply deliver the message to processing subsystem 1530. Processing subsystem 1530 may also be unable to decrypt the message, but it can recognize the message as encrypted and deliver it to cryptographic logic module 1540. Cryptographic logic module 1540 can decrypt the message (e.g., using information extracted from secure storage module 1538) and determine what information to return to processing subsystem 1530. As a result, certain information can be available only within secure storage module 1538 and cryptographic logic module 1540. If secure storage module 1538 and cryptographic logic module 1540 are implemented on a single integrated circuit that executes code only from an internal secure repository, this can make extraction of the information extremely difficult, which can provide a high degree of security. Other implementations are also possible.

Accessory 1500 can be any electronic apparatus that interacts with controller 1400. In some embodiments, controller 1400 can provide remote control over operations of accessory 1500 as described above. For example controller 1400 can provide a remote user interface for accessory 1500 that can include both input and output controls (e.g., a display screen to display current status information obtained from accessory 1500 and an input control such as a touchscreen overlay to allow changes to the status information). Controller 1400 in various embodiments can control any function of accessory 1500 and can also receive data from accessory 1500.

It will be appreciated that the system configurations and components described herein are illustrative and that variations and modifications are possible. It is to be understood that an implementation of controller 1400 can perform all operations described above as being performed by a controller and that an implementation of accessory 1500 can perform any or all operations described above as being performed by an accessory. A proxy, bridge, tunnel, or coordinator can combine components of controller 1400 and accessory 1500, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible. Controllers and accessories can communicate using a variety of transports, and techniques described herein with reference to Bluetooth LE and/or HTTP/IP as a transport can be adapted to other transports. The particular processes for establishing pairings, pair-verified sessions, and encrypting payloads of requests and responses can be modified as desired. The structure of an accessory attribute database can also be modified, and an attribute database can include various ancillary services to facilitate communication with controllers. Connections between an accessory or controller can be direct or via a tunnel or proxy as described above.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for controlling an accessory using a controller, the method comprising:
    establishing, by the controller, a session key usable to encrypt messages exchanged with the accessory;
    identifying, by the controller, a target characteristic of the accessory, the target characteristic comprising an attribute of the accessory that is configured to be controlled based at least in part on data being written to the target characteristic;
    determining, by the controller, write data to be written to the target characteristic of the accessory, the write data comprising information configured to instruct the accessory to control the attribute of the accessory corresponding to the target characteristic;
    identifying, by the controller, an identifier of the target characteristic;
    generating, by the controller, a first payload that comprises the write data and the identifier of the target characteristic;
    encrypting, by the controller, the first payload with the session key;
    sending, by the controller, a first instruction to the accessory, the first instruction comprising the first payload and an indication that the accessory should temporarily store the write data and the identifier of the target characteristic;

receiving, by the controller, a first response from the accessory, the first response comprising a first signed data block indicating that the accessory received the first instruction;

in response to receiving the first response, sending, by the controller, a second instruction to the accessory, the second instruction comprising a second payload comprising the identifier of the target characteristic and indicating that the accessory should write the write data from the first payload to the target characteristic in accordance with the received identifier corresponding to the stored identifier; and receiving, by the controller, a second response from the accessory, the second response comprising a second signed data block indicating that the accessory received and executed the second instruction.

2. The method of claim 1, wherein the first payload further comprises a time to live parameter, the time to live parameter indicating a time to live for the first instruction, wherein the accessory executes the second instruction only if the second instruction is received before the time to live expires.

3. The method of claim 1, wherein the controller sends the second instruction only if the first response is received within a timeout period after sending the first instruction.

4. The method of claim 1, wherein writing the write data to the target characteristic results in changing an aspect of a physical state of the accessory.

5. The method of claim 1, wherein the first payload further comprises a transaction identifier generated by the controller and wherein the first response comprises a response payload signed by the accessory, the response payload comprising the transaction identifier.

6. The method of claim 1, wherein the controller communicates with the accessory using a Bluetooth LE transport and wherein the first instruction is sent as a GATT write request identifying the target characteristic.

7. The method of claim 1, wherein the controller communicates with the accessory using an HTTP transport and wherein the first instruction is sent as an HTTP POST request to a first URL defined at the accessory.

8. An electronic device, comprising:
a wireless communication interface to communicate with an accessory; and
one or more processors coupled to the wireless communication interface, the one or more processors being configured to:
  establish, via the wireless communication interface, a session key usable to encrypt messages exchanged with the accessory;
  identify a target characteristic of the accessory, the target characteristic comprising an attribute of the accessory that is configured to be controlled based at least in part on data being written to the target characteristic;
  determine write data to be written to the target characteristic of the accessory, the write data comprising information configured to instruct the accessory to control the attribute of the accessory corresponding to the target characteristic;
  identify an identifier of the target characteristic;
  generate a first payload that comprises the write data and the identifier of the target characteristic;
  encrypt the first payload with the session key;
  send, via the wireless communication interface, a first instruction to the accessory, the first instruction comprising the first payload and an indication that the accessory should temporarily store the write data and the identifier of the target characteristic;
  receive, via the wireless communication interface, a first response from the accessory, the first response comprising a first signed data block indicating that the accessory received the first instruction;
  send, in response to receiving the first response, a second instruction to the accessory via the wireless communication interface, the second instruction comprising a second payload comprising the identifier of the target characteristic and indicating that the accessory should write the write data from the first payload to the target characteristic in accordance with the received identifier corresponding to the stored identifier; and
  receive, via the wireless communication interface, a second response from the accessory, the second response comprising a second signed data block indicating that the accessory received and executed the second instruction.

9. The electronic device of claim 8, wherein the wireless communication interface is configured to communicate with the accessory using a Bluetooth LE protocol and wherein a processing subsystem of the electronic device is configured to send the first instruction and the second instruction as GATT write requests conforming to the Bluetooth LE protocol.

10. The electronic device of claim 9, wherein the processing subsystem is further configured to send a GATT read request to the accessory after sending the first instruction and wherein the first response is received as a response to the GATT read request.

11. The electronic device of claim 8, wherein the wireless communication interface is configured to communicate with the accessory using an HTTP-based protocol and wherein the processing subsystem is further configured to send the first instruction and the second instruction as HTTP POST requests addressed to two different URLs at the accessory.

12. The electronic device of claim 8, wherein the first payload further comprises a time to live parameter, the time to live parameter indicating a time to live for the first instruction, wherein the accessory executes the second instruction only if the second instruction is received before the time to live expires.

13. A non-transitory computer-readable storage medium having stored therein program code that, when executed by one or more processors of an accessory device, cause the one or more processors to perform operations comprising:
establishing a session key usable to encrypt messages exchanged with a controller;
receiving a first instruction from the controller, the first instruction comprising a first payload encrypted with the session key;
extracting, from the first payload, write data and an identifier of a target characteristic to which the write data is to be written, the write data comprising information that controls the attribute of the accessory corresponding to the target characteristic;
identifying the target characteristic, the target characteristic comprising an attribute of the accessory that is configured to be controlled based at least in part on writing the write data to the target characteristic;
sending a first response to the controller, the first response comprising a first signed data block indicating that the accessory received the first instruction;
storing, temporarily, the write data and the identifier of the target characteristic;

receiving a second instruction from the controller, the second instruction comprising a second payload comprising the identifier of the target characteristic and indicating that the accessory should write the write data from the first payload to the target characteristic in accordance with the received identifier corresponding to the stored identifier;

determining whether the second instruction is received within a time to live after sending the first response;

in response to determining that the second instruction is not received within the time to live, ignoring the second instruction; and in response to determining that the second instruction is received within the time to live and the received identifier corresponds to the stored identifier, executing the second instruction, the execution of the second instruction comprising writing the write data from the first payload to the target characteristic.

14. The non-transitory computer-readable storage medium of claim 13, wherein executing the second instruction further comprises changing an aspect of a physical state of the accessory based on the write data and the target characteristic.

15. The non-transitory computer-readable storage medium of claim 13, further comprising:
   extracting, by the accessory, a time to live parameter from the first payload, wherein the time to live is determined based on the time to live parameter.

16. The non-transitory computer-readable storage medium of claim 13, further comprising:

after executing the second instruction, sending, by the accessory, a second response to the controller, the second response comprising a second signed data block indicating that the accessory executed the second instruction.

17. The non-transitory computer-readable storage medium of claim 13, further comprising:
   sending, by the accessory, an error message to the controller in the event that the second instruction is not received within the time to live.

18. The non-transitory computer-readable storage medium of claim 13, wherein the accessory communicates with the controller using a Bluetooth LE transport and wherein the first instruction is sent as a GATT write request comprising the identifier of the target characteristic.

19. The non-transitory computer-readable storage medium of claim 18, further comprising:
   extracting, by the accessory, a second identifier of the target characteristic from the first payload; and
   determining, by the accessory, whether the identifier of the target characteristic and the second identifier of the target characteristic correspond to a same target characteristic,
   wherein the accessory does not write the write data to the target characteristic unless the identifier of the target characteristic and the second identifier of the target characteristic correspond to the same target characteristic.

* * * * *